(12) United States Patent
Kurokawa et al.

(10) Patent No.: US 6,571,350 B1
(45) Date of Patent: May 27, 2003

(54) DATA STORAGE METHOD AND DATA STORAGE FOR AVERAGING WORKLOAD IN A REDUNDANT STORAGE CONFIGURATION

(75) Inventors: Hiroshi Kurokawa, Hadano (JP); Shinichi Mihashi, Hadano (JP); Hiroshi Yamada, Kawasaki (JP); Toshiaki Kawamura, Hadano (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/472,148

(22) Filed: Dec. 27, 1999

(30) Foreign Application Priority Data

Dec. 25, 1998 (JP) .......................................... 10-369223

(51) Int. Cl.⁷ .............................................. G06F 11/16
(52) U.S. Cl. .............................. 714/6; 714/5; 711/162
(58) Field of Search ......................... 709/400; 711/114, 711/120, 162, 202; 714/5, 6, 7

(56) References Cited

U.S. PATENT DOCUMENTS 4,993,016 A * 2/1991 Richards .................... 340/2.71
5,193,175 A * 3/1993 Cutts et al. ................. 709/400
5,481,670 A * 1/1996 Hatashita et al. ............... 714/7
6,253,301 B1 * 6/2001 Razdan et al. .............. 711/202

FOREIGN PATENT DOCUMENTS

JP         6-259336        9/1994

* cited by examiner

*Primary Examiner*—B. James Peikari
(74) *Attorney, Agent, or Firm*—Mattingly, Stanger & Malur, P.C.

(57) ABSTRACT

Duplicate data are stored in separate storage units SU(0) 16 and SU(1) 26, respectively. The storage area in each of SU(0) 16 and SU(1) 26 is divided into master storage regions and sub storage regions each of which is allocated alternately to the storage units in increments of fixed addresses. The store request is issued to both of the storage units allocated the master storage region and the sub storage region, and the fetch request is issued to one of the storage units allocated the master storage region from the RSC(0) 34 and RSC(1) 44.

14 Claims, 21 Drawing Sheets

MEMORY MAP

FIG.17A Request sent from PU to RSC
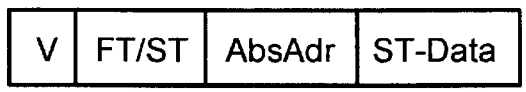
FIG.17B Request issued from RSC
FIG.17C Issued Request Signal
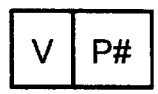
FIG.17D Response Signal
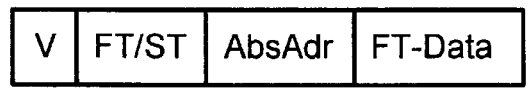
FIG.17E Invalidation Request
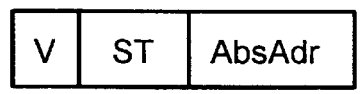

FIG.19A

Translation Table corresponding to Memory Map in FIG.2

| AbsAdr | Master S# | Master PhyAdr | Sub S# | Sub PhyAdr |
|---|---|---|---|---|
| 0K~ 4K-1 | S0 | 0K~ 4K-1 | S1 | 0K~ 4K-1 |
| 4K~ 8K-1 | S1 | 4K~ 8K-1 | S0 | 4K~ 8K-1 |
| 8K~12K-1 | S0 | 8K~12K-1 | S1 | 8K~12K-1 |
| 12K~16K-1 | S1 | 12K~16K-1 | S0 | 12K~16K-1 |
| 16K~20K-1 | S0 | 16K~20K-1 | S1 | 16K~20K-1 |
| 20K~24K-1 | S1 | 20K~24K-1 | S0 | 20K~24K-1 |

FIG.19B

Translation Table corresponding to Memory Map in FIG.6

| AbsAdr | Master S# | Master PhyAdr | Sub S# | Sub PhyAdr |
|---|---|---|---|---|
| 0M~ 4M-1 | S0 | 0M~ 4M-1 | S1 | 0M~ 4M-1 |
| 4M~ 8M-1 | S1 | 4M~ 8M-1 | S0 | 4M~ 8M-1 |
| 8M~12M-1 | S2 | 0M~ 4M-1 | S3 | 0M~ 4M-1 |
| 12M~16M-1 | S3 | 4M~ 8M-1 | S2 | 4M~ 8M-1 |
| 16M~20M-1 | S0 | 8M~12M-1 | S1 | 8M~12M-1 |
| 20M~24M-1 | S1 | 12M~16M-1 | S0 | 12M~16M-1 |

DATA STORAGE METHOD AND DATA STORAGE FOR AVERAGING WORKLOAD IN A REDUNDANT STORAGE CONFIGURATION

BACKGROUND OF THE INVENTION

The present invention relates to a data handling system having a redundant storage configuration. More particularly, the present invention relates to a data storage suitable for averaging workload and for matching contents between storage devices having duplicate data respectively, and constituting a redundant storage arrangement.

Japanese Laid-open Patent Application No. 06-259336 discloses a technique for matching contents between a master extended storage and a sub extended storage both of which constitute a redundant storage configuration. The disclosed technique involves matching the order in which to perform store operations on the master and the sub extended storage devices in order to keep contents identical between the master and the sub extended storage devices. However, the disclosure contains no reference to fetch operations on the master and the sub extended storage devices.

SUMMARY OF THE INVENTION

One way of increasing the speed of data handling systems is by resorting to the so-called cache memory scheme. The cache memory is a high-speed memory having a smaller capacity than a main storage or other types of storage. As such, the cache memory accommodates data that are frequently used. When desired data are found in the cache memory (this case is described as "cache hit" below), the amount of time required to access the data is short because the target data are accessed by simply referencing the cache memory. When the desired data are not found in the cache memory (that case is described as "cache miss" below), it becomes necessary to access the main memory or other appropriate memory where the data should reside. Since there is a large difference in data access time between the case where the target data are found in the cache memory (i.e. cache hit) and the case where the data are not in the cache memory (i.e. cache miss), the effective data access time may be shorted by having frequently referenced data held in the cache memory. So far, however, there have been few known ways of maintaining redundant storage performance when a cache miss has occurred in one or more of the storage devices constituting the redundant storage configuration.

It is known to provide processors each incorporating a cache memory whose contents reflect those of a storage area of the main storage or other types of storage. Each of these processors causes data in its cache memory to be invalidated when data in the storage are updated by any other processor, so as to prevent a mismatch in contents between the cache memory and the storage. However, there have been few references to ways of making coherence control more effective between the cache memory and the storage where a redundant storage configuration is involved.

A first problem to be solved by the present invention involves making even the workload between a master storage and a sub storage. A store operation needs to be performed on all of the master storage and the sub storage to maintain data coherency therebetween, and a fetch operation need only be carried out on the master storage. In such cases, the workload on the master storage is greater than that on the sub storage. When the master storage and the sub storage have identical capabilities, the throughput of the entire storage arrangement is necessarily dependent on the performance of the master storage. If it is possible to even out the workload between the master storage and the sub storage, then the storage configuration as a whole will provide higher throughput than before.

A second problem to be solved by the present invention involves maintaining operational consistency between the master storage and the sub storage. In one example, fetch requests may be issued only to the master storage. In another example, with multi-storage devices incorporating a cache memory each, any one store request may have a cache hit in one storage but may result in a cache miss in the other storage. In such cases, the operation on the master storage and that on the sub storage are differently timed. This can disrupt operational consistency between the master storage and the sub storage. The technique disclosed in the above-cited Japanese Laid-open Patent Application No. 06-259336 involves unilaterally sequencing store operations into the same order for both the master extended storage and the sub extended storage. This technique appears to ensure the execution of redundant operations, except that a decline in performance can arise from the fact that store requests to different addresses are also kept in sequence. That is, when the preceding store request resulted in a cache miss in the sub storage alone, the ensuing store request to the sub storage must wait to be processed even if the latter store request has a cache hit.

A third problem to be solved by the present invention involves making even the cache miss processing time between a redundant storage configuration and non-redundant storage configuration having one or more storage devices each having a cache memory. Suppose that in the redundant storage configuration having a master storage and a sub storage each incorporating a cache memory, a store request results in a cache miss in all of the master storage and the sub storage. In that case, cache miss processing for the master storage is first completed, followed by cache miss processing for the sub storage. Accordingly, in the redundant storage configuration, the cache miss processing takes twice the time it takes in the non-redundant storage configuration.

A fourth problem to be solved by the invention is related to data coherence control between data in the storage devices, and data in cache memories incorporated in each processor. Where a redundant storage control scheme is in effect, the processors should be issued a minimum of invalidation requests to ensure data coherence with multi-storage devices constituting a redundant storage configuration. Suppose that a processor has changed data at an address in a storage. When the data at that address are also found in the cache memory of any other processor, the data need to be invalidated. In such a case, the multi-storage devices with respect to the processors may each issue an invalidation request, which is redundant.

In solving the first problem above and according to one aspect of the present invention, there is provided a data storage having separate storage devices, in which duplicate data are stored, respectively. In the data storage, in response to at least two fetch requests from the processing device, which two fetch requests are to fetch different first and second desired data out of the duplicate data, respectively, wherein the first desired data is fetched from one of the separate storage devices and the second desired data is fetched from the other of the separate storage devices. Accordingly, workload can be substantially averaged between the separate storage devices even if fetch operations are carried out on only one of the separate storage devices.

In solving the second problem above and according to another aspect of the invention, there is provided a data storage having separate storage devices, in which duplicate data are stored, respectively, for sequencing store requests and storing each desired data at the same address in all of the separate storage devices with the same sequenced order. This arrangement makes it possible to ensure data coherency between the separate storage devices even if their operations are differently timed. For example, when the preceding request resulted in a cache miss, a subsequent request to a different reference address may start being processed before the processing of the preceding request is completed.

In solving the third problem above and according to a further aspect of the invention, there is provided a data storage having separate storage devices, in which duplicate data are stored, respectively, and separate second storage devices corresponding to the separate storage devices, respectively, and having a copy of a part of data stored in corresponding separate storage devices. In the data storage, data stored at the same address as that at which the desired data for a store request is stored, are transferred from at least two of the separate storage devices to corresponding at least two separate second storage devices, in parallel, when the at least two separate second storage devices do not have the data. That is, the cache miss processing time in such the data storage can be approximately shortened and equivalent to other data storage.

In solving the fourth problem above and according to an even further aspect of the invention, there is provided a data storage having separate storage devices, in which duplicate data are stored, respectively, to which a plurality of the processing devices issue store requests, wherein each of the processing devices having a second storage device retaining a copy of a part of data stored in at least one of the separate storage devices. In the data storage, an invalidation request, which is to invalid the same data in the second storage devices as the desired data for the store requests, is transferred at least to the second storage devices of the processing devices other than one of the processing devices having issued the store requests, in response to storing the desired data in only one of the separate storage devices. In dealing with the store requests, each of other separate storage devices need not cause issuance of invalidation requests to the second storage devices. This arrangement prevents redundant issuance of invalidation requests.

BRIEF DESCRIPTION OF THE DRAWINGS

FIGS. 17A, 17B, 17C, 17D, and 17E are schematic views showing typical formats of requests;

FIGS. 19A and 19B are tables listing examples of translation table data in the request sending control unit;

DESCRIPTION OF THE PREFERRED EMBODIMENTS

Figure 1:
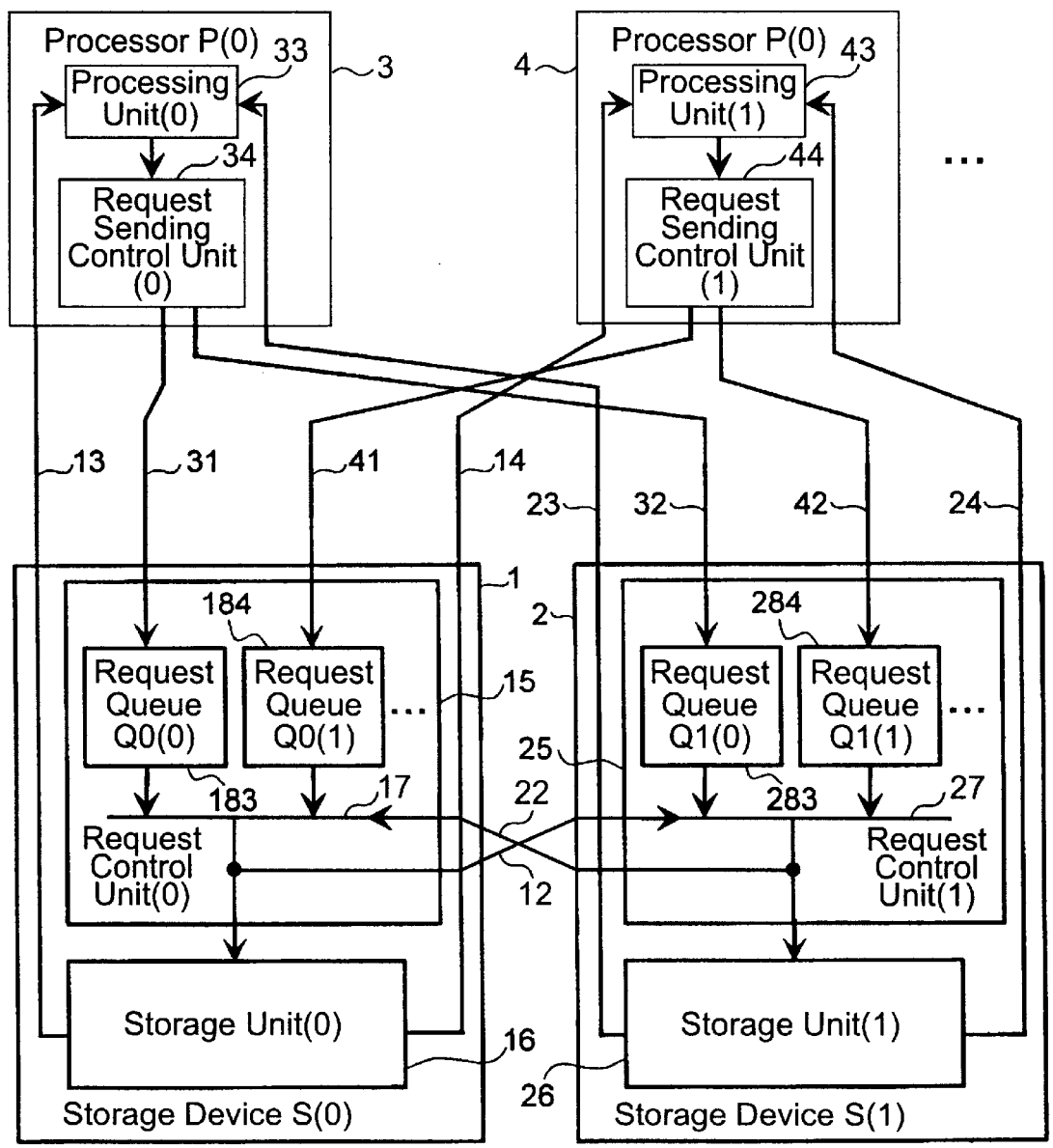
FIG. 1 is a block diagram showing an overall constitution of a first embodiment of the present invention.

FIG. 1 is a block diagram showing an overall constitution of a data handling system in an embodiment of the present invention. In FIG. 1, the data handling system comprises two separate storage devices S(0) 1 and S(1) 2 and a plurality of processors P(0) 3, P(1) 4, etc. The two separate storage devices S(0) 1 and S(1) 2 constitute a data storage. The two separate storage devices S(0) 1 and S(1) 2 and a plurality of processors P(0) 3, P(1) 4, etc. are interconnected. The processor P(0) 3 has a processing unit PU(0) 33 and a request sending control unit RSC(0) 34. The same structure applies to the processor P(1) 4 and other processors as well. The storage device S(0) 1 comprises a request control unit RC(0) 15 and a storage unit SU(0) 16. The request control unit RC(0) 15 includes request queues Q0(0) 183, Q0(1) 184, etc., corresponding to each processor P(0) 3, P(1) 4, etc., and a request issuing unit 17. Each of the request queues Q0(0) 183 and Q0(1) 184 are an FIFO type buffer memory, holding fetch requests and store requests after they are received from the processors P(0) 3 and P(1) 4 and until they are issued by the requesting issuing unit 17. The same constitution applies to the storage device S(1) 2 as well. The two separate storage devices S(0) 1 and S(1) 2, especially the separate storage units SU(0) 16 and SU(1) 26 constitute a redundant storage configuration. That is, duplicate data are stored in the separate storage units SU(0) 16 and SU(1) 26 of the separate storage devices S(0) 1 and S(1) 2, respectively. As mentioned below, one of the storage units SU(0) 16 and SU(1) 26 performs as a master storage and another one performs as a sub storage in accordance with each address.

In the data handling system shown in FIG. 1, each processor P(0) 3, P(1) 4, etc. and each storage device S(0) 1 and S(1) 2 is supplied power from a power supply (not shown). In each processor P(0) 3, P(1) 4, etc., at least one software which includes an operating system and all kinds of programs are executed on the basis of information input from an outside and a execution result of the programs is output to outside or shown on a display device (not shown).

In storing or fetching data to or from the storage devices S(0) 1 and S(1) 2, each of the processors P(0) 3, P(1) 4, etc., sends a store request or a fetch request to the storage devices S(0) 1 and S(1) 2 over request signal lines 31 and 32, or 41 and 42. A destination storage device for a store request or a fetch request is determined by the RSC(0) 34, RSC(n) 44, etc., in accordance with the meaning and address of the request from the PU(0) 33, PU(1) 34, etc. Request meanings and details of the RSC will be described later.

Store requests or fetch requests sent to the storage devices S(0) 1 and S(1) 2 are accumulated in the request queues Q0(0) 183 and Q0(1) 184, Q1(0) 283 and Q1(1) 284, etc., in the RC(0) 15 and RC(1) 25. From each of the request queues, requests are issued one by one by the request issuing units 17 and 27. When a store request is issued, relevant data are stored into the storage units SU(0) 16 and SU(1) 26. When a fetch request is issued, relevant data are fetched from the storage unit SU(0) 16 or SU(1) 26. The retrieved data are transferred to the processor P(0) 3 or P(1) 4 which issued the fetch request over response signal lines 13 and 14, or 23 and 24. When a store request to one of the storage unit SU(0) 16 and SU(1) 26 which performs as a master storage device is issued by one of the request issuing units 17 and 27, an issued request signal is sent to the other request issuing unit over a signal line 12 or 22. The format of issued signals and of response signals as well as details of the request issuing unit will be described later.

Figure 2:
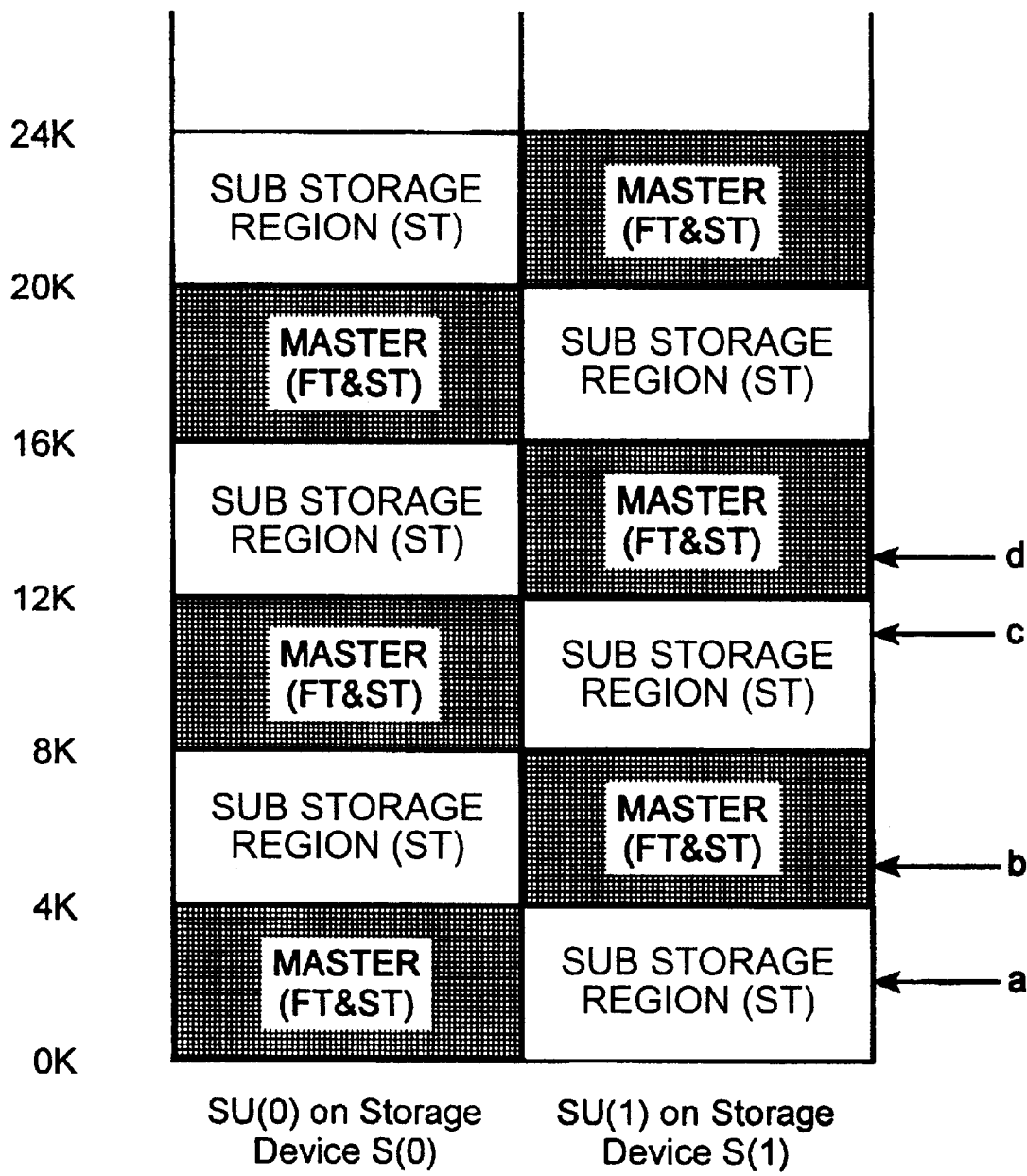
FIG. 2 is a schematic view of a typical memory map according to the invention.

FIG. 2 is a schematic view of a memory map representing contents of the storage units SU(0) 16 and SU(1) 26 in the storage devices S(0) 1 and S(1) 2. This is an example in which the storage area in each of the SU(0) 16 and the SU(1) 26 is divided into master storage regions and sub storage regions. Each of the master storage regions and the sub storage regions is allocated alternately to the storage units SU(0) 16 and SU(1) 26 in increments of 4K addresses (K=1,024). In other words, each of the master storage regions and the sub storage regions is interleaved to the storage units SU(0) 16 and SU(1) 26 in increments of 4K addresses. Duplicate data are stored in each of master storage regions and a sub storage regions allocated alternately to the storage units SU(0) 16 and SU(1) 26 in increments of 4K addresses and the storage units SU(0) 16 and SU(1) 26 constitute a redundant storage configuration. One of the storage units SU(0) 16 and SU(1) 26 allocated a master storage regions in each increment of 4K addresses performs as a master storage and another one allocated a sub storage regions in each increment of 4K addresses performs as a sub storage device.

For example, a first master storage region is allocated to address locations from 0K to 4K of the storage unit SU(0) 16 and a first sub storage region is allocated to the same address locations of the storage unit SU(1) 26. On the other hand, a second master storage region is allocated to next address locations from 4K to 8K of the storage unit SU(1) 26 and a second sub storage region is assigned to the same address locations of the storage unit SU(0) 16. That is, each of the master storage regions and the sub storage regions are allocated alternately to the storage units SU(0) 16 and SU(1) 26 in every increments of 4K address locations.

Fetch requests (FT) and store requests (ST) are both issued to the master storage regions, whereas only store requests (ST) are issued to the sub storage regions. Because the master storage regions and sub storage regions are interleaved in each of the storage units SU(0) 16 and SU(1) 26, fetch requests can be issued in an averaged manner to the two storage units. If workload need not be made even between the storage units, there is no need for the master storage regions and sub storage regions to be interleaved.

Figure 3:
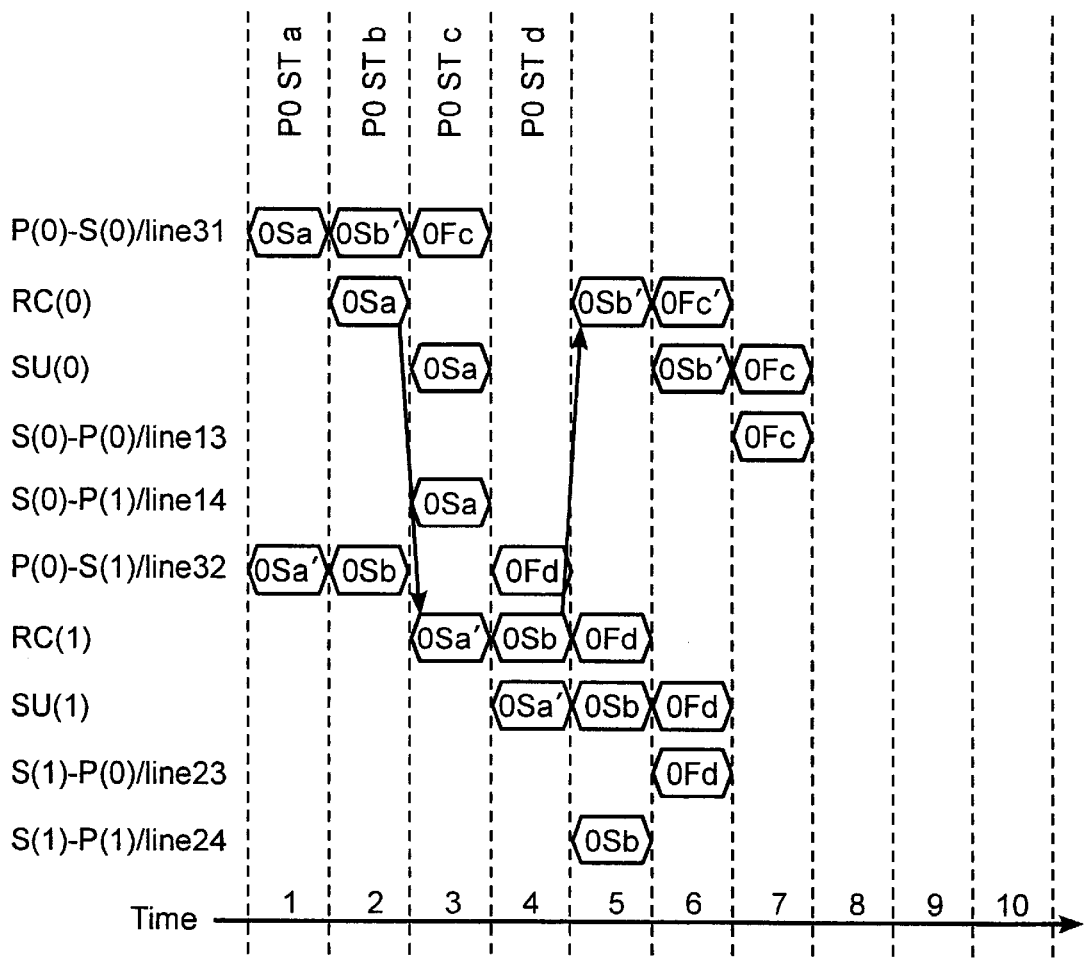
FIG. 3 is a timing chart illustrating a first operation example of the embodiment.

FIG. 3 is a timing chart illustrating a first operation example of this embodiment. This timing chart shows that fetch requests and store requests issued by a processor may be processed in any one of the storage devices S(0) 1 and S(1) 2 which works as the master storage device. FIG. 3 shows the operation example in case that the processor P(0) 3 issues the following: (1) a store request (POSTa) to address "a", (2) a store request (POSTb) to address "b", (3) a fetch request (POFTc) to an address "c", and (4) a fetch request (POFTd) to address "d", in that order.

For purposes of explanation, each of the store requests and the fetch requests above are provided with an identification symbol. The leftmost numeric character (0) denotes a processor (0); the next upper-case alphabetic characters (F or S) represents a fetch request (FT) or a store request (ST); and the rightmost lower-case alphabetic character (a, b, c or d) corresponds to one of the addresses shown in FIG. 2. Since a store request is issued to both the storage devices S(0) 1 and S(1) 2, the store request sent to the master storage region is named "the master store request" and the store request sent to the sub storage region is named "the sub store request" and identification symbol for the sub store request is identified by a prime symbol (').

At time 1 showed in FIG. 3, the store request (POSTa) is issued by the RSC(0) 34 of the processor P(0) 3 to both the storage devices S(0) 1 and S(1) 2. Since address "a" of a master storage region is in the storage unit SU(0) 16 and address "a" of a sub storage region is in the storage unit SU(1) 26 as indicated in FIG. 2, the RSC(0) 34 sends over the request signal lines 31 and 32 a master store request (0Sa) to the master storage region in the storage device S(0) 1 and a sub store request (0Sa') to the sub storage region in the storage device S(1) 2. At time 2, in the storage device S(0) 1, the master store request (0Sa) to the master storage region is issued by the request issuing unit 17. At time 3, relevant data are stored into the storage unit SU(0) 16 at the address "a". At time 2, the request issuing unit 17 transmits a issued signal over the issued signal line 12 to notify the request issuing unit 27 in the storage device S(1) 2 that the store request (0Sa) to the master storage region has been issued. It is only after the store request to the master storage region has been issued that the sub store request to the sub storage region may be issued. After the storage device S(1) 2 was notified at time 2 of the issuance of the master store request (0Sa) to the master storage region over the issued signal line 12, the request issuing unit 27 in the request control unit RC(1) 25 issues the sub store request to the sub storage region (0Sa') at time 3. At time 4, relevant data are stored into the storage unit SU(1) 26 at address "a".

Processing of the next store request (POSTb) will now be described. Since address "b" of a master storage region is in the storage unit SU(1) 26 and address "b" of a sub storage region is in the storage unit SU(0) 16 as depicted in FIG. 2, at time 2, the RSC(0) 34 of the processor P(0) 3 sends over the request signal lines 31 and 32 a master store request (0Sb) to the master storage region in the storage device S(1) 2 and a sub store request (0Sb') to the sub storage region in the storage device S(0) 1. At time 3, in the storage device S(1) 2, the master store request (0Sb) is queued in the request queue Q1(0) 283 to allow for issuance of the preceding sub store request (0Sa'). At time 4, the master store request (0Sb) is issued by the request issuing unit 27. At time 5, relevant data are stored into the master storage region of the storage unit SU(1) 26 at address "b". At time 4, the request issuing unit 27 sends a issued signal over the issued signal line 22 to notify the request issuing unit 17 in the storage device S(0) 1 that the master store request (0Sb) has been issued. In response, at time 5, the request issuing unit 17 in the storage device S(0) 1 issues the sub store request (0Sb'). At time 6, relevant data are stored into the sub storage region in the storage unit SU(0) 16 at address "b".

At time 3, the storage device S(0) 1 sends over the response signal line 14 the store request information (0Sa) to the processors (i.e., processor P(1) 4 in this case) other than the processor P(0) 3 that issued the store request (POSTa). At time 5, the storage device S(1) 2 likewise sends the store request information (0Sb) to the processor P(1) 4. These operations are necessary when each of the processors incorporate a cache memory, and details will be explained later in connection with a FIG. 13. Accordingly, in FIG. 4 and in subsequent timing charts, each storage is shown sending store request information to the processors other than the processor having issued the store request.

The fetch requests (POFTc) and (POFTd) will now be described. Since address "c" of a master storage region is in the storage unit SU(0) 16 and address "c" of a sub storage region is in the storage unit SU(1) 26 as depicted in FIG. 2, at time 3, a fetch request (0Fc) is issued to the storage device S(0) 1 having address "c" of a master storage region. At times 4 and 5, the fetch request (0Fc) is queued in the request queue Q0(0) 183 of the storage device S(0) 1. At time 6, the fetch request (0Fc) is issued by the request issuing unit 17. At time 7, relevant data are fetched from address "c" of the storage unit SU(0) 16 and are transferred to the processor P(0) 3 over the response signal line 13. Since address "d" of a master storage region is in the storage unit SU(1) 26 and address "d" of a sub storage region is in the storage unit SU(0) 16 as depicted in FIG. 2, at time 4, a fetch request (0Fd) is issued to the storage device S(1) 2 having address "d" in a master storage region. Because issuance of the preceding request (0Sb) is completed at time 4 in the storage device S(1) 2, the fetch request (0Fd) is issued at time 5 by the request issuing unit 27. At time 6, relevant data are fetched from the storage unit SU(1) 26 and are transferred to the processor P(0) 3 over the response signal line 23.

Figure 4:
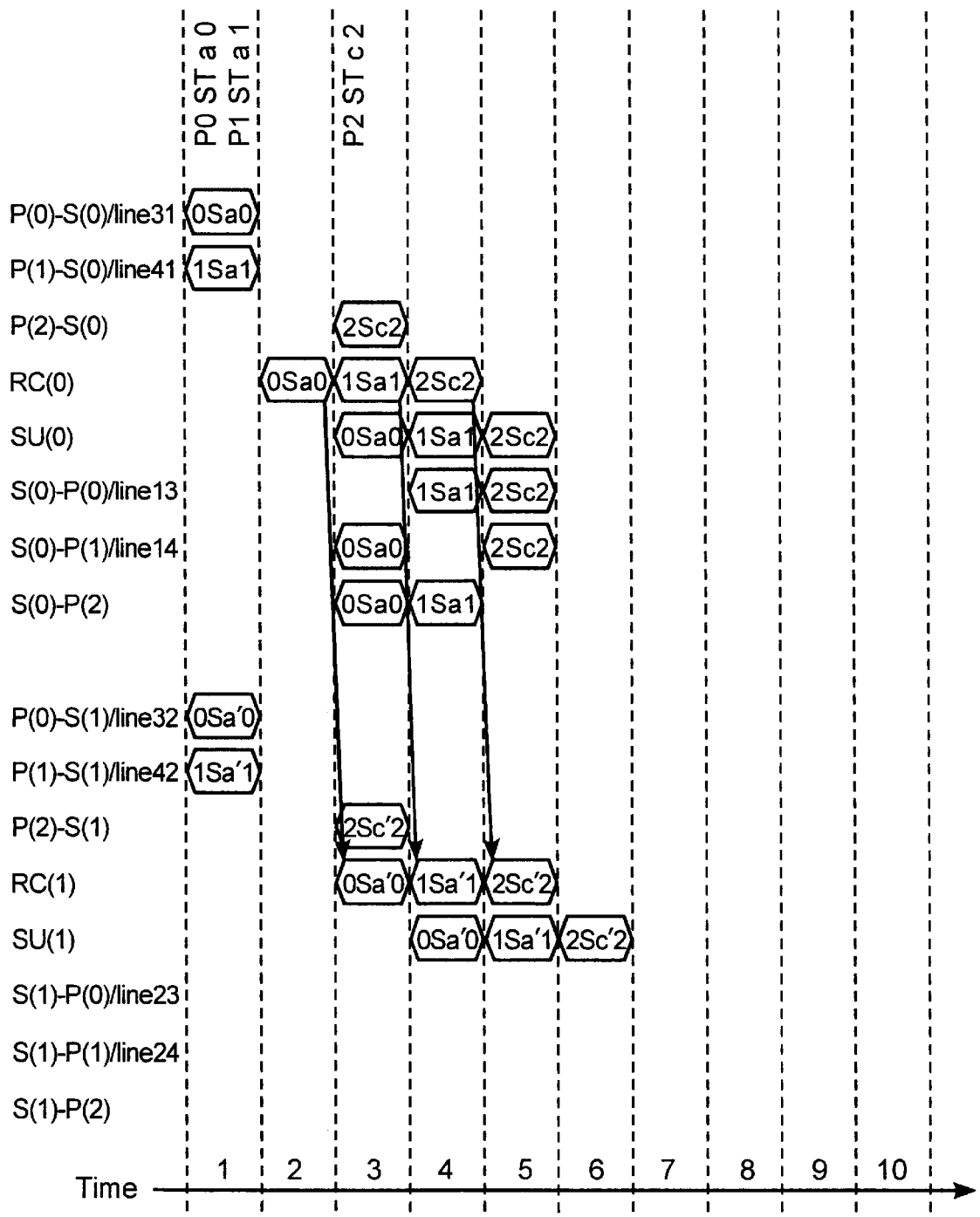
FIG. 4 is a timing chart indicating a second operation example of the embodiment.

FIG. 4 is a timing chart indicating a second operation example of the embodiment. Described below with reference to FIG. 4 is what takes place when a plurality of processors write data to the same address. Specifically, three processors issue three store requests, respectively: (1) at time 1, the processor P(0) 3 issues a store request (POSTa0) for storing a value "0" to address "a"; (2) at time 1, the processor P(1) 4 issues a store request (P1STa1) for storing a value "1" to address "a"; and (3) at time 3, the processor P(2) issues a store request (P2STc2) for storing a value, "2" to address "c." The rightmost numeric character suffixed to each request name denotes the data to be stored.

At time 1, the RSC(0) 34 of the processor P(0) 3 issues a master store request (0Sa0) to the storage device S(0) 1 having address "a" of a master storage region and a sub store request (0Sa'0) to the storage device S(1) 2 having address "a" of a sub storage region. Also at time 1, the RSC(1) 44 of the processor P(1) 4 issues a master store request (1Sa1) to the storage device S(0) 1 and a sub store request (1Sa'1) to the storage device S(1) 2. At time 2, the issuance of the master store request (0Sa0) and that of the master store request (1Sa1) by the request issuing unit 17 are in conflict for the storage device S(0) 1. In this example, where two or more requests are in conflict, the one having the smaller processor number of all is given priority. Although there are other ways of selecting one of such requests in conflict, they are well known and their descriptions are omitted.

In the storage device S(0) 1, the master store request (0Sa0) issued by the processor P(0) 3 having the smaller processor number is issued at time 2 from the request queue Q0(0) 183 by the request issuing unit 17. At time 3, data "0" are stored into address "a" of the storage unit SU(0) 16. At time 2, the request issuing unit 17 notifies the other request issuing unit 27 that the master store request (0Sa0) has been issued. In turn, the sub store request (0Sa'0) is issued at time 3 from the request queue Q1(0) 283 by the request issuing unit 27 in the storage device S(1) 2. At time 4, data "0" are stored into address "a" of the storage unit SU(1) 26.

Meanwhile, the master store request (1Sa1) from the processor P(1) 4 which lost in conflict to the other store request at time 2 is issued at time 3 by the request issuing unit 17 from the request queue Q0(1) 184 in the storage device S(0) 1. At time 4, data "1" are stored into address "a" of the storage unit SU(0) 16. At time 3, the request issuing unit 17 notifies the other request issuing unit 27 that the master store request (1Sa1) has been issued. In turn, the sub store request (1Sa'1) is issued at time 4 from the request queue Q1(1) 284 by the request issuing unit 27 in the storage device S(1) 2. At time 5, data "1" are stored into address "a" of the storage unit SU(1) 26.

At time 3, there are no events causing master and sub store requests (2Sc2, 2Sc'2) issued by the processor P(2) to be queued. Thus these requests are processed in the storage devices S(0) 1 and S(1) 2 without waiting for processing any preceding store requests.

In this embodiment, as described above, store requests to the sub storage regions are issued by the corresponding request issuing unit in the same order in which store requests to the master storage regions are processed. This scheme is implemented by use of the issued signal lines interconnecting the request issuing units of the storage devices. Under this scheme, it is ensured that store requests to the same address are processed in the same order for both the master storage regions and the sub storage regions. That in turn guarantees data coherency between the master storage regions and the sub storage regions constituting the redundant storage configuration.

Figure 5:
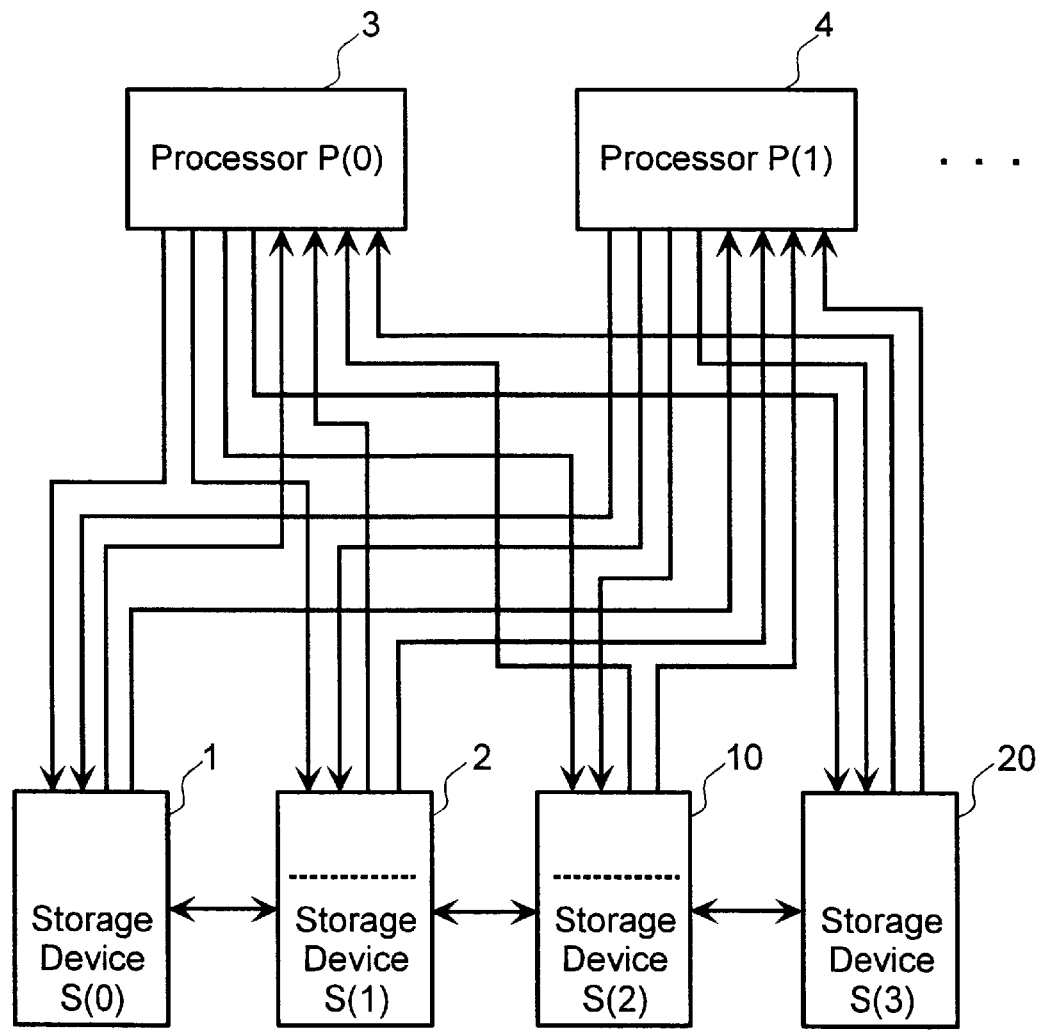
FIG. 5 is a block diagram showing another overall constitution of the embodiment.

FIG. 5 is a block diagram showing another overall constitution of the above embodiment, i.e., an expanded variation of the setup in FIG. 1 having four storage devices. In general, a redundant storage configuration may include three or more storage devices. That is, duplicate data are stored in the three or more storage devices, respectively. And master storage regions and sub storage regions may be interleaved in any increments of addresses of any storage devices. When storing data or fetching data to or from storage devices, the processors P(0) 3, P(1) 4, etc., send store requests or fetch requests to the storage devices S(0) 1, S(1) 2, S(2) 10 and S(3) 20. More specifically, fetch requests are sent only to the storage assigned a master storage region which includes a address to be accessed and store requests are sent to both storage devices assigned a master storage region and a sub storage region which include a address to be accessed respectively. In the storage devices S(0) 1, S(1) 2, S(2) 10 and S(3) 20, requests from the processors P(0) 3, P(1) 4, etc., are queued and then issued in sequence. When a store request is issued, relevant data are stored into the storage devices allocated a master storage region and a sub storage region which include a address to be accessed respectively.

When a fetch request is issued, relevant data are fetched from the storage allocated a master storage region which includes a address to be accessed and are transferred to the processor which issued the fetch request. If a master store request is issued in any one of the storage devices S(0) 1, S(1) 2, S(2) 10 and S(3) 20, the issuance is reported to the other storage devices. In the storage holding a sub store request, that sub store request starts getting issued in response to the report of the issuance of the master store request. When each of the processors incorporate a cache memory as will be described later, each of the storage devices S(0) 1, S(1) 2, S(2) 10 and S(3) 20 upon processing a master store request notifies the processors other than the processor having issued the master store request that data have been updated.

Figure 6:
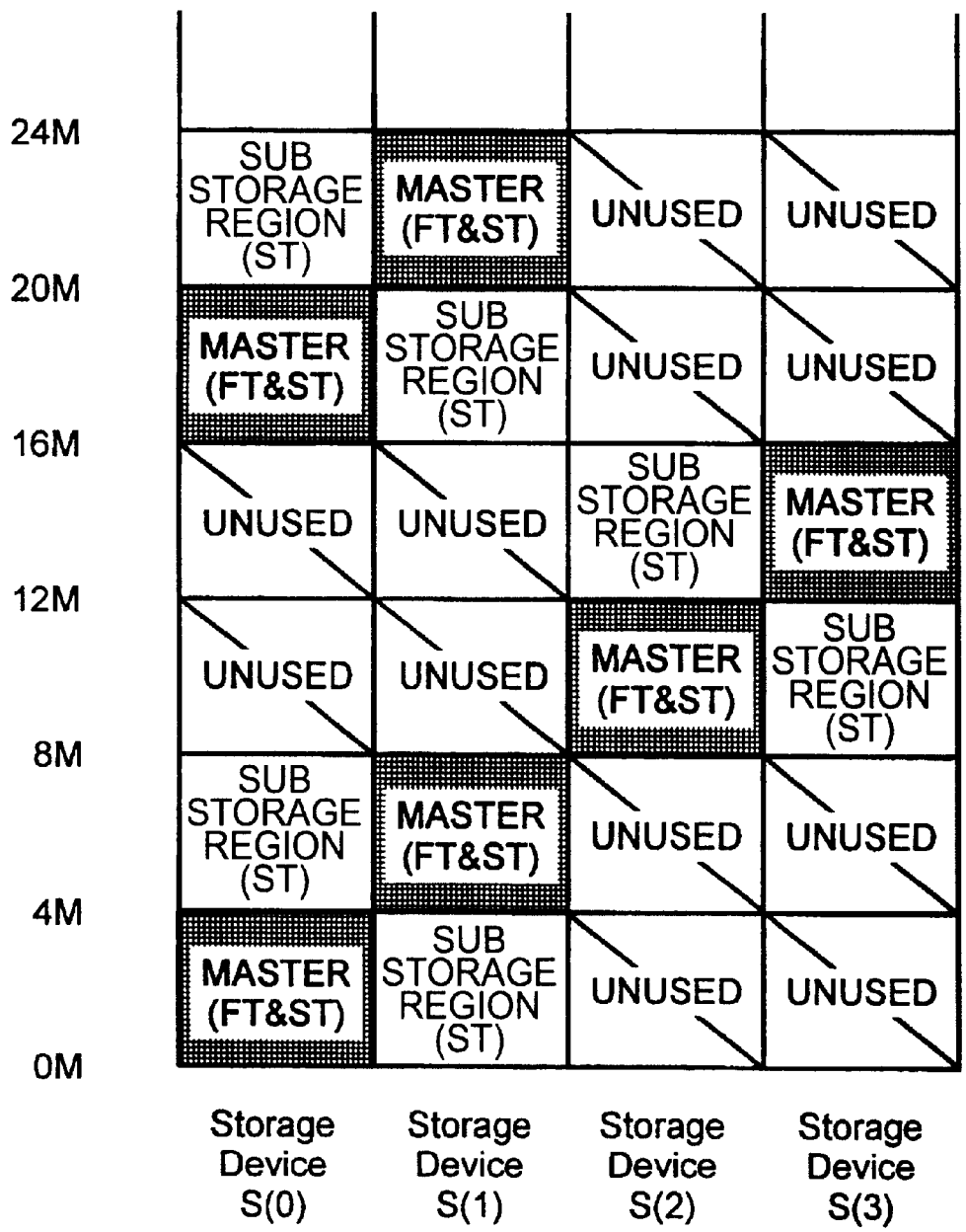
FIG. 6 is a schematic view of another typical memory map according to the invention.

FIG. 6 is a schematic view of a memory map representing contents of four storage devices S(0) through S(3) in the structure of FIG. 5. Duplicate data are stored in the four storage devices S(0) through S(3) in the structure of FIG. 5, respectively. In the memory map of FIG. 6, each address is assigned either a master storage region or a sub storage region. Any address of the storage devices which is not assigned either of the master storage region and the sub storage region are indicated as "unused" in FIG. 6. In this example, each master storage region is interleaved to the storage devices S(0) through S(3) in units of 4M address locations (M=1,048,576). Each storage is paired uniquely with another storage in a redundant storage configuration. For example, when the storage device S(0) acts as the master storage in one of units of 4M address locations, the storage device S(0) is the sub storage; when the storage (1) serves as the master storage in other one of units of 4M address locations, the storage device S(0) is used as the sub storage; when the storage S(2) is the master storage in other one of units of 4M address locations, then the storage S(3) is the sub storage; when the storage S(3) acts as the master storage in other one of units of 4M address locations, the storage S(2) is utilized as the sub storage.

Where there are three or more storage devices as described, the destination of a store request or a fetch request can be still determined by the request sending control unit RSC of each processor holding memory map information such as that in FIG. 6. The request issuing units of three or more storage devices are interconnected by issued signal lines, whereby store requests to the sub storage region may be controlled in terms of issuance timing.

Figure 7:
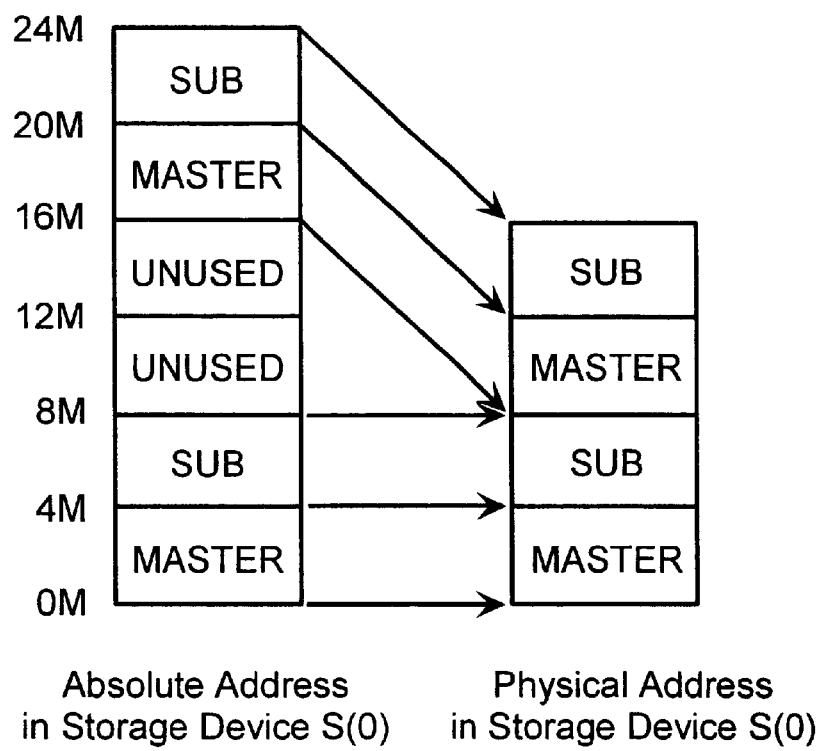
FIG. 7 is a schematic view depicting correspondence between absolute address regions and physical address regions in the memory map of FIG. 6.

In FIG. 6, the storage unit (physical memory) in each of the storage devices S(0) through S(3) may utilize memory space more effectively if unused regions are reduced. FIG. 7 is a schematic view showing correspondence between absolute address regions and physical address regions in the storage device S(0). The same correspondence applies to the other storage devices S(1), S(2) and S(3). In such cases, the request sending control unit RSC of each processor translates an absolute address in each of fetch request and store request into a physical address before sending those request to the storage devices S(0) through S(3). Details of such an operation will be described later. In the memory map of FIG. 2, absolute addresses are identical to physical addresses.

Figure 8:
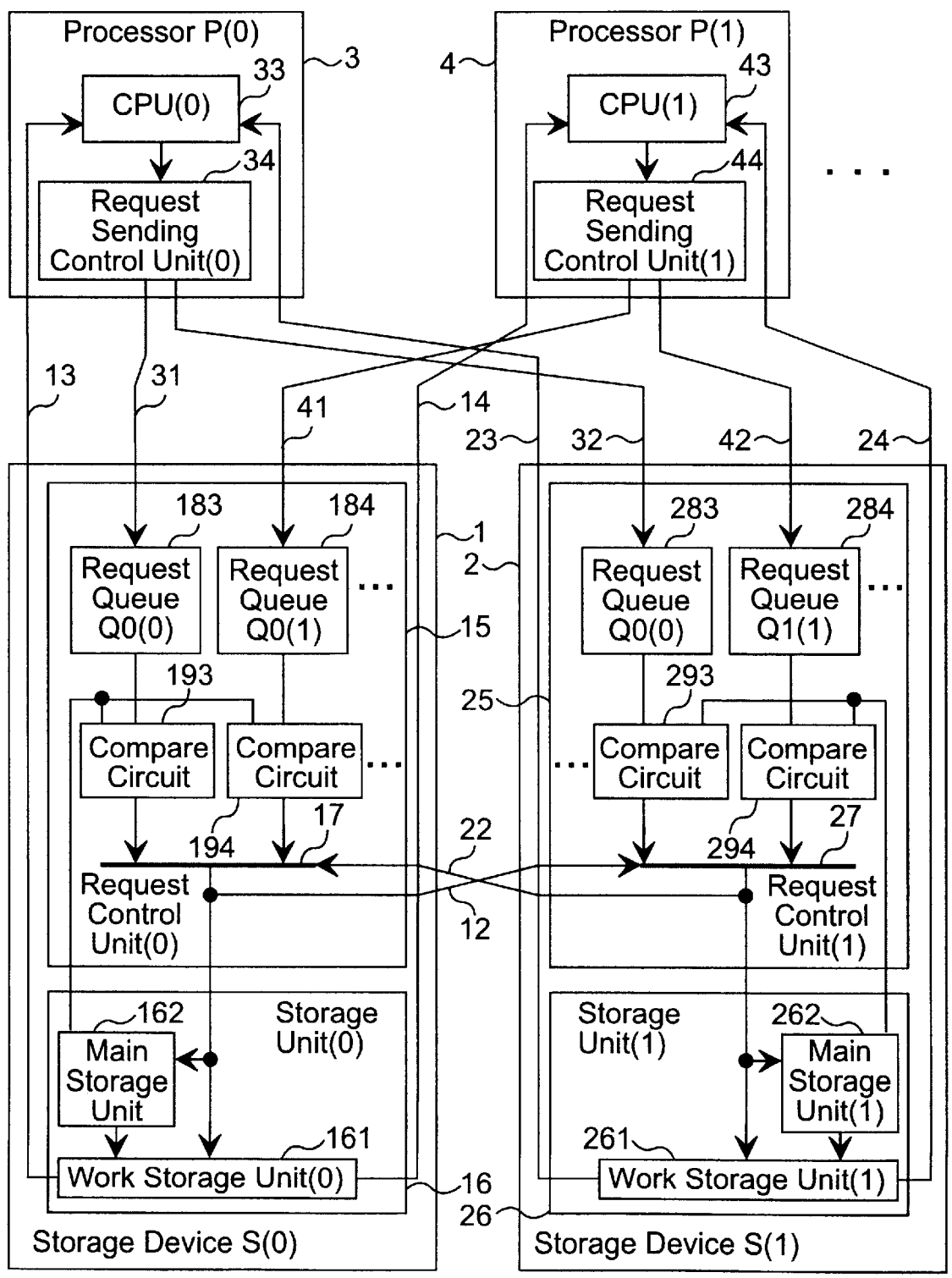
FIG. 8 is a block diagram showing a detailed overall constitution of the embodiment of the invention.

FIG. 8 is a block diagram showing an detailed overall constitution of the data handling system in the above embodiment. In FIG. 8, each of storage units SU(0) 16 and SU(1) 26 incorporates a work storage WS as a cache memory smaller in capacity and higher in speed than the main storage. In FIG. 8, storage units SU(0) 16 and SU(1) 26 in the storage devices S(0) 1 and S(1) 2 respectively incorporate work storages WS(0) 161 and WS(1) 261 which retain copies of a part of data in main storages MS(0) 162 and MS(1) 262. Duplicate data are stored in the main storages MS(0) 162 and MS(1) 262, respectively. Strictly speaking, the SU(0) 16 and SU(1) 26 in FIG. 8 differ from the SU(0) 16 and SU(1) 26 in FIG. 1 in that the storage units contain the WS(0) 161 and WS(1) 261. However, since their functions are substantially the same as those of their counterparts in FIG. 1, the storage units in FIG. 8 are given the same reference numerals 16 and 26 for ease of understanding. Given a store request or a fetch request, the storage unit SU(0) 16 or SU(1) 26 stores or fetches data directly to or from the WS(0) 16 or WS(1) 26 when the WS(0) 16 or WS(1) 26 contains desired data to be referenced (this case is described as "InWS (In Work Storage)" below). When the desired data are not found in the WS(0) 16 or WS(1) 26 (that case is described as "NIWS (Not In Work Storage)" below), the storage unit SU(0) 16 or SU(1) 26 fetches a block data including the desired data from the MS(0) 162 or MS(1) 262 and transfers the block data in the WS. And then the storage unit SU(0) 16 or SU(1) 26 again accesses the WS(0) 16 or WS(1) 26 for a fetch operation or a store operation. The process of fetching block data including the desired data from the MS when the data are not found in the WS (NIWS) and storing the block data in the WS is called "NIWS processing". Data block transfer is carried out between the WS and the MS in a well known manner and will not be described further.

While data are being fetched from the MS subject to NIWS processing, the storage region in the MS which includes the data must be protected from any other attempts of reference thereto. This is accomplished by furnishing the request control units RC(0) 15 and RC(1) 25 respectively with address compare/control circuits 193, 194, etc., and 293, 294, etc., corresponding to the processors configured. If the same storage region is to be referenced by another store request or fetch request, issuance of that request from the request queue is prohibited. Usually the address compare/control circuits let all requests issued from the request queues pass unchecked. Once NIWS processing is started, the address compare/control circuits block any request having the same address as that of the request causing the NIWS processing currently referencing the MS and all requests from the same processor that issued the request. At the end of the reference to the MS, the requests that were denied access to the MS because they were subject to NIWS processing are allowed to pass by the address compare/control circuits.

For the description that follows, it is assumed that when data to be referenced are found in the WS, the storage unit processing time is 1 (cycle) and that when the desired data to be referenced are not found in the WS and are located in the MS, the time required to process reference to the MS is 3 (cycles).

Figure 9:
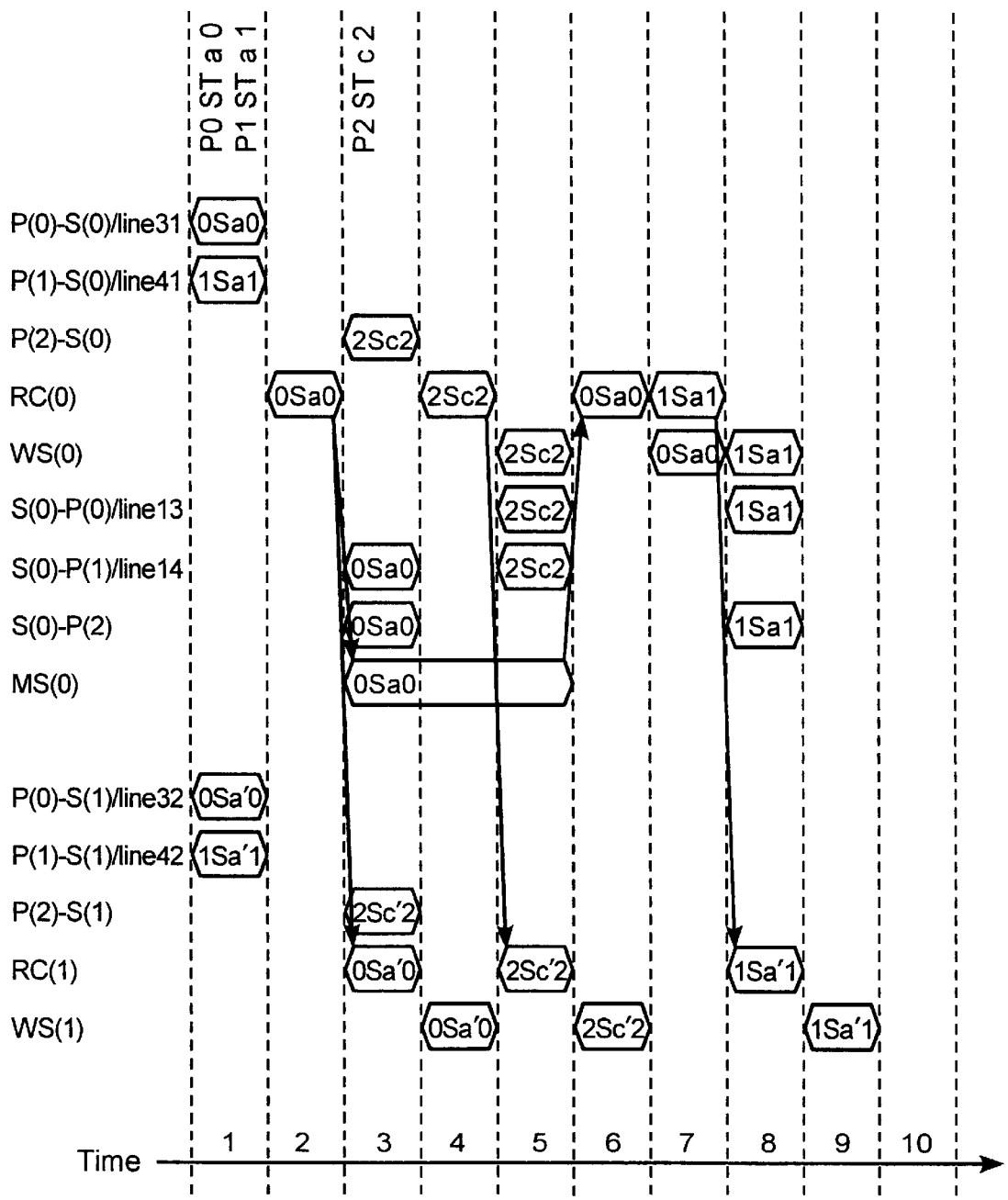
FIG. 9 is a timing chart illustrating a first operation example of the detailed constitution of the embodiment.

FIG. 9 is a timing chart depicting a first operation example of the data handling system shown in FIG. 9. Described below with reference to FIG. 9 is what takes place when issued requests are timed in the same manner as in the example of FIG. 4, and when a master store request (0Sa0) has caused NIWS processing in the storage device S(0) 1.

The master store request (0Sa0) issued by the processor P(0) 3 is issued at time 2 in the storage device S(0) 1. Because the data to be referenced are not found in the WS(0) 161, NIWS processing is started at time 3 on the MS(0) 162. At this point, the master store request (0Sa0) is sent from the MS(0) 162 back to the address compare/control circuit 193 because the MS is being referenced. The processing of the master store request is put on hold. Any other request having the same address as that of the master store request on hold and all requests from the same processor P(0) 3 that issued the master store request are suppressed. When NIWS processing is terminated at time 6, the address compare/control circuit 198 allows the master store request (0Sa0) to pass through. The master store request (0Sa0) is issued by the request issuing circuit 17. At time 7, data "0" are written to the WS(0) 161. In the storage device S(1) 2, a sub store request (0Sa'0) is issued at time 3. At time 4, data "0" are written to the WS(1) 261. Once NIWS processing is started, the WS need only be referenced upon elapse of a fixed period of time. In this example, at time 6, the master store request (0Sa0) that has caused NIWS processing is given top priority and issued by the request issuing unit 17. This allows the sub store request (0Sa'0) to be issued on the storage device S(1) 2 side when NIWS processing regarding the master store request (0Sa0) is started on the storage device S(0) 1 side.

A master store request (1Sa1) issued by the processor P(1) 4 loses in conflict to the master store request (0Sa0) at time 2 and is queued. At times 3, 4 and 5, the master store request (1Sa1) is being blocked by the address compare/control circuit 194 because it has the same address as that of the master store request (0Sa0) subject to NIWS processing. At time 5, the master store request (1Sa1) is still blocked in order to allow the master store request (0Sa0) to be issued with top priority. At time 7, the request (1Sa1) is finally issued. At time 8, data "1" are written to the WS(0) 161. Because the issuance of the request is delayed in the storage device S(0) 1, a sub store request (1Sa'1) is issued at time 8 in the storage device S(1) 2. At time 9, data "1" are written to the WS(1) 261.

A master and a sub store requests (2Sc2, 2Sc'2) issued by the processor P(2) at time 3 have addresses different from those of other requests (0Sa0, 0Sa'0, 1Sa1, 1Sa'1). For that reason, the master and a sub store requests from the processor P(2) are selected by the address compare/control circuits earlier than the other requests. This allows the master and a sub store requests (2Sc2, 2Sc'2) to be timed in the same manner as their counterparts in the example of FIG. 4.

Figure 10:
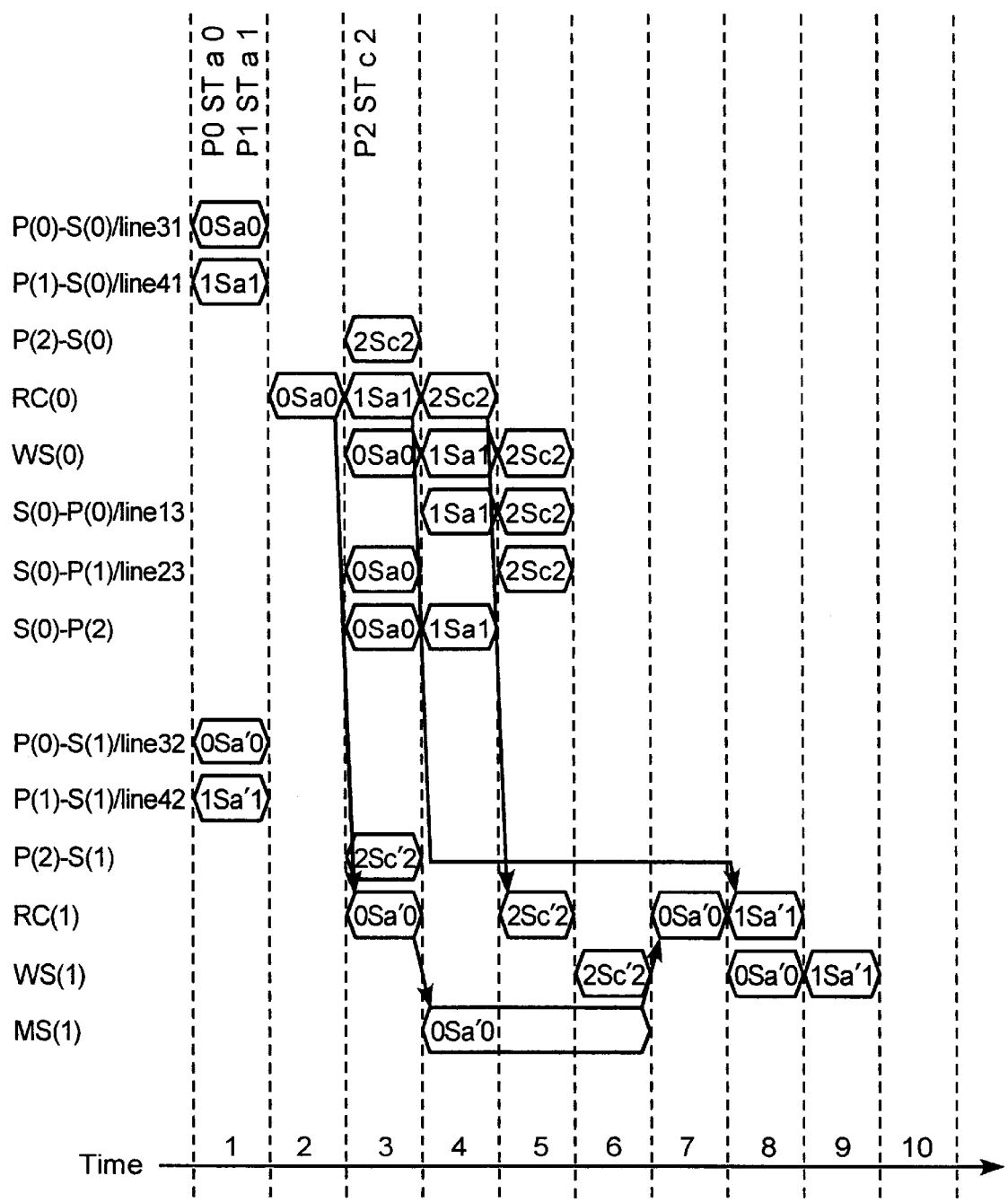
FIG. 10 is a timing chart indicating a second operation example of the detailed constitution of the embodiment.

FIG. 10 is a timing chart indicating a second operation example. Described below with reference to FIG. 10 is what takes place when issued requests are timed in the same manner as in the example of FIG. 4 but, contrary to the example of FIG. 9, when the sub store request (0Sa'0) has caused NIWS processing in the sub storage device S(1) 2.

Given the master store request (0Sa0) issued by the processor P(0) 3, the storage device S(0) 1 operates in the same manner as shown in FIG. 4 except that data are written to the WS(0) 161. In the storage device S(1) 2, the sub store request (0Sa'0) is issued at time 3. Because the WS(1) 261 does not contain the data to be referenced, NIWS processing is started. At times 4, 5 and 6, the MS(1) 262 is referenced for the data. At time 7, the sub store request (0Sa'0) is again issued. At time 8, data "1" are written to the WS(1) 261. In these steps, the ensuing sub store request (1Sa'1) is being blocked by the address compare/control circuit 294 at times 4, 5 and 6 because the sub store request (1Sa'1) has the same address as that of the sub store request (0Sa'0) undergoing NIWS processing. At time 7, the sub store request (1Sa'1) is kept from getting issued by the request issuing unit 27 in order to allow the sub store request (0Sa'0) to be issued with top priority. The sub store request (1Sa'1) is finally issued at time 8. At time 9, data "1" are written to the WS(1) 261.

Because the master and the sub store requests (2Sc2, 2Sc'2) from the processor P(2) have reference addresses different from those of the other requests (0Sa0, 0Sa'0, 1Sa1, 1Sa'1), the master and the sub store requests (2Sc2, 2Sc'2) may be selected earlier than the other requests (0Sa0, 0Sa'0, 1Sa1, 1Sa'1). In the end, the operation timings of the master and the sub store requests (2Sc2, 2Sc'2) prove to be the same as those in the examples of FIGS. 4 and 9.

Figure 11:
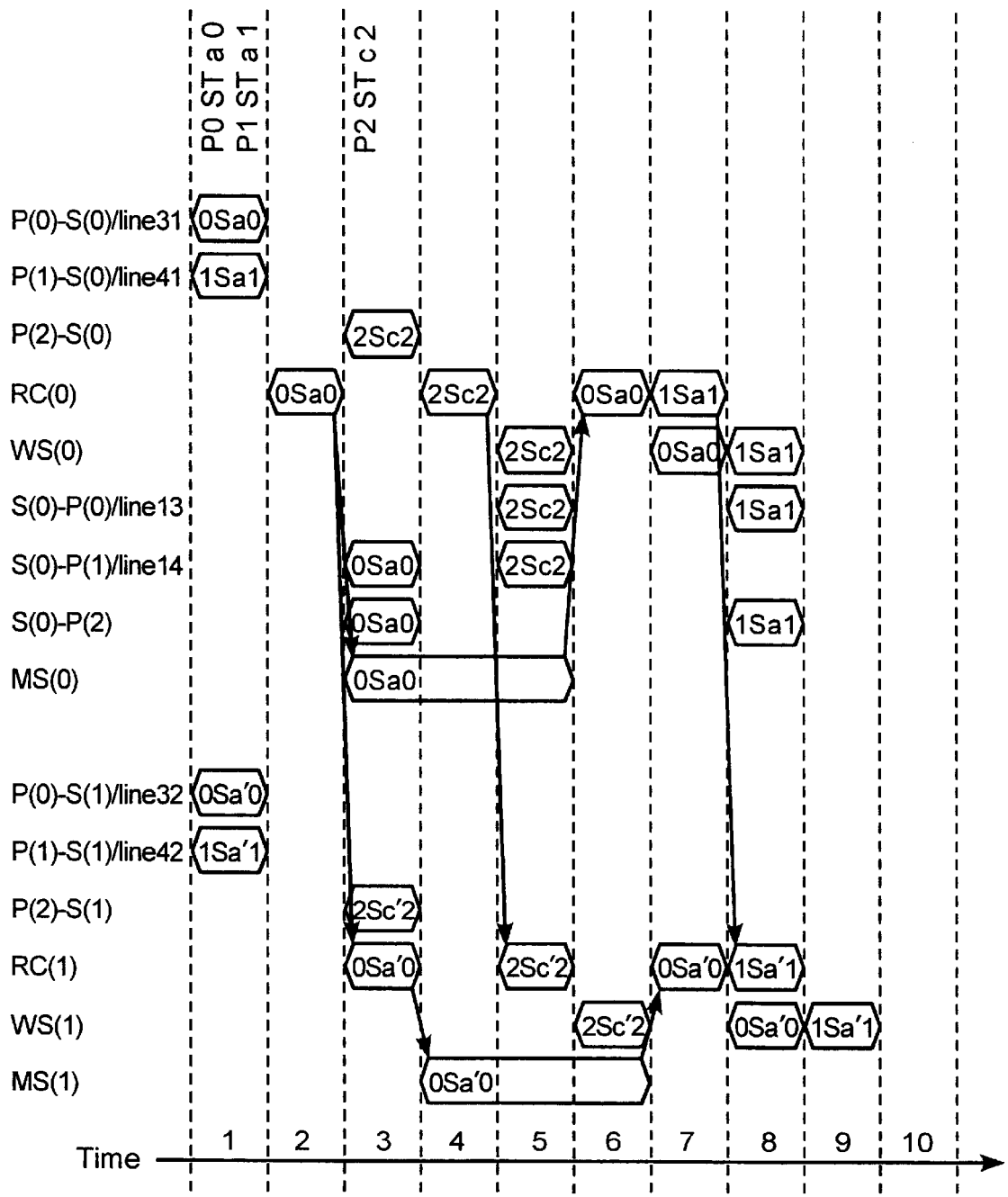
FIG. 11 is a timing chart describing a third operation example of the detailed constitution of the embodiment.

FIG. 11 is a timing chart indicating a third operation example. Described below with reference to FIG. 11 is what takes place when issued requests are timed in the same manner as in the example of FIG. 4, and when the master and a sub store request (0Sa0, 0Sa'0) have caused NIWS processing in the storage device S(0) 1 and the storage device S(1) 2 respectively.

The master store request (0Sa0) issued by the processor P(0) 3 is issued at time 2 in the storage device S(0) 1. At time 3, NIWS processing is started for the MS(0) 162. The sub store request (0Sa'0) is issued at time 3 in the storage device S(1) 2. At time 4, NIWS processing is started for the MS(1) 262. Thus the operation of the master store request (0Sa0) turns out to be the same as that in FIG. 9, and the operation of the sub store request (0Sa'0) becomes the same as that in FIG. 10. The operation of the master store request (1Sa1) from the processor P(1) 4 which lost in conflict to the master store request (0Sa0) at time 2 proves to be the same as that in FIG. 9. The operation of the sub store request (1Sa'1), ready to be issued the moment the processing of the preceding sub store request (0Sa'0) has ended, turns out to be the same as that in FIG. 9. The master and the sub store requests (2Sc2, 2Sc'2) from the processor P(2) are allowed to be processed earlier than the other requests (0Sa0, 0Sa'0, 1Sa1, 1Sa'1) because the master and the sub store requests (2Sc2, 2Sc'2) have reference addresses different from those of the other requests (0Sa0, 0Sa'0, 1Sa1, 1Sa'1). In the end, the operation timings of the master and the sub store requests (2Sc2, 2Sc'2) prove to be the same as those in the examples of FIGS. 4, 9 and 10.

Figure 12:
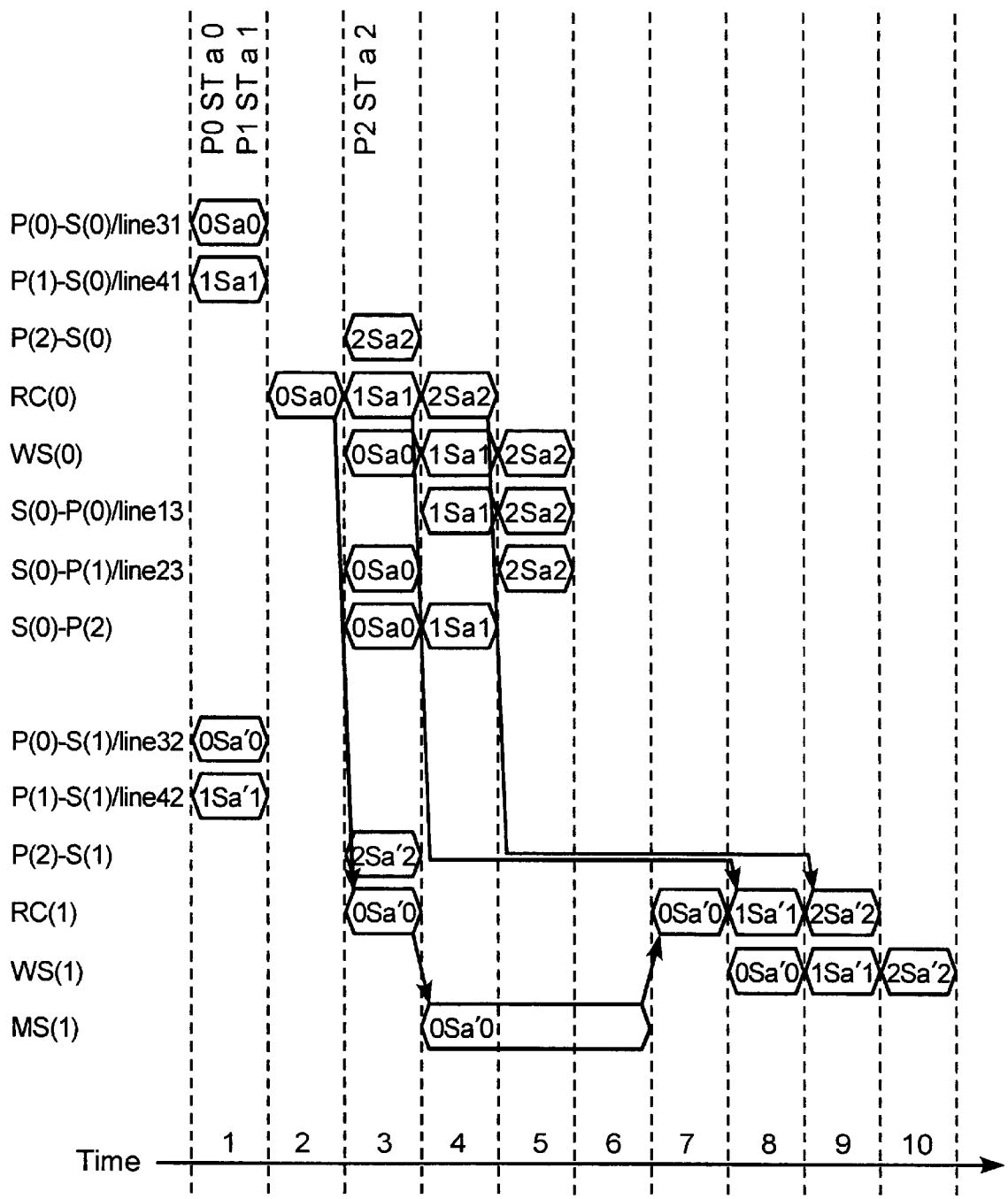
FIG. 12 is a timing chart showing a fourth operation example of the detailed constitution of the second embodiment.

FIG. 12 is a timing chart indicating a fourth operation example. Described below with reference to FIG. 12 is what takes place when store requests issued by the processor P(2) have the same destination as that of the preceding requests from the processors P(0) 3 and P(1) 4, and when the sub store request (0Sa'0) from the processor P(0) 3 has caused NIWS processing in the sub storage device S(1) 2.

The operations of the preceding store requests (0Sa0, 0Sa'0, 1Sa1, 1Sa'1) from the processors P(0) 3 and P(1) 4 are the same as those in FIG. 10. The master store request (2Sa2) issued by the processor P(2) is processed following the master store request (1Sa1) in the storage device S(0) 1. In the storage device S(1) 2, at time 8, the sub store request (1Sa'1) from the processor P(1) 4 and the sub store request (2Sa'2) from the processor P(2) are both ready to be issued. Because the sub store requests are issued in the storage device S(1) 2 in the same order in which the master store requests (1Sa1, 2Sa2) are issued in the storage device S(0) 1, the sub store request (2Sa'2) is processed following the sub store request (1Sa'1) in the storage device S(1) 2.

As described above, exchanging of issued signals allow the storage devices to start its issuance of the sub store requests substantially at the same time that the other storage has started NIWS processing related to the master store requests on its MS. This renders the wait time of requests subject to NIWS processing substantially the same between two cases: where NIWS processing is started in all of the storage devices, and where NIWS processing is started in any of the storage devices. In addition, the storage devices can be equipped with address compare/control circuits allowing some requests to be processed earlier than other requests having different addresses. This feature boosts the throughput of request processing despite the presence of some events causing requests to wait in queue such as NIWS processing. Naturally, all requests are not allowed to overtake one another in the flow of processing if they access the same address. In that case, the sequence of request processing remains the same for both of the storage devices allocated a master storage region and a sub storage region respectively.

Figure 13:
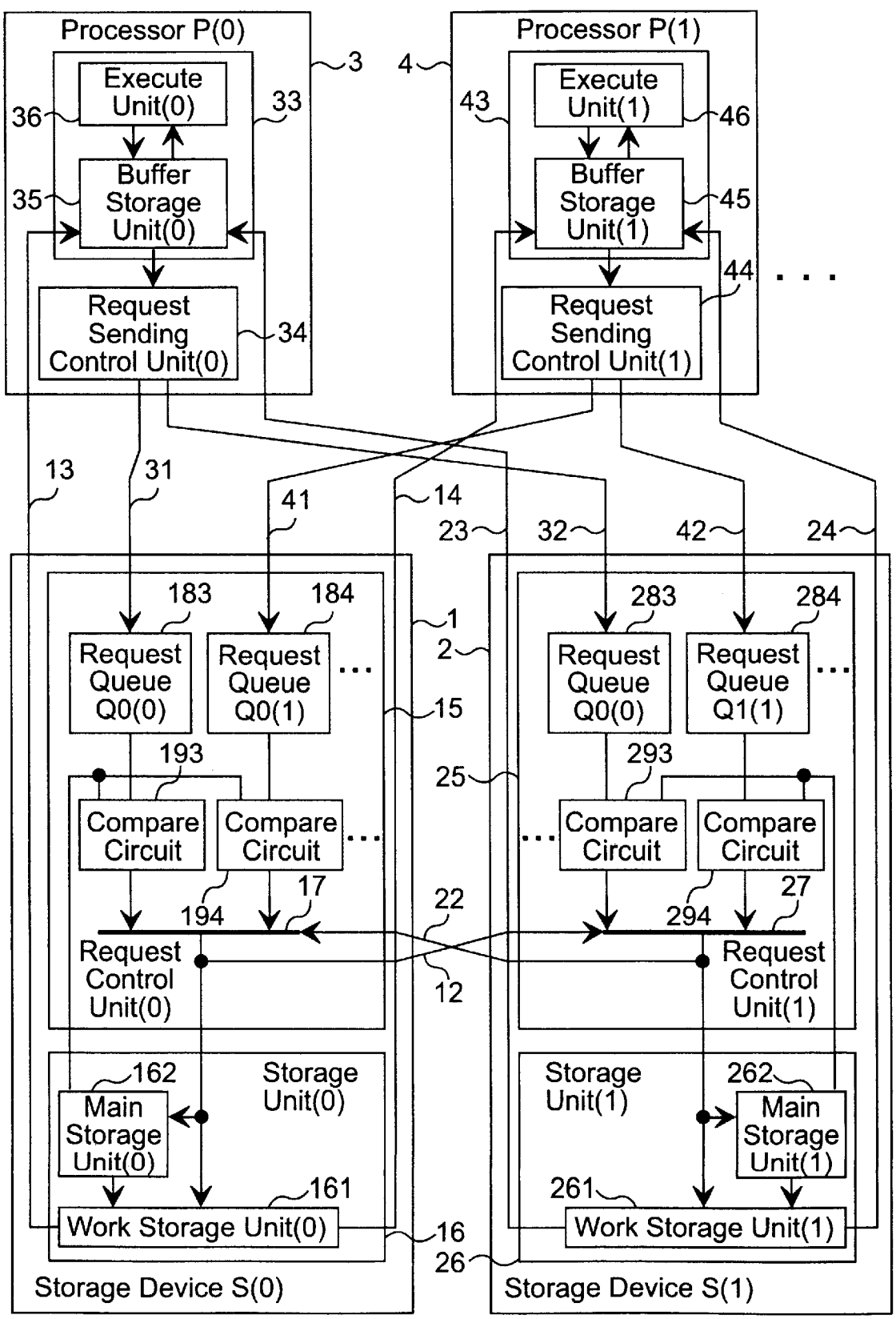
FIG. 13 is a block diagram illustrating a further detailed overall constitution of a third embodiment of this invention.

FIG. 13 is a block diagram illustrating a more detailed overall constitution of the data handling system in the above embodiment. In FIG. 13, each processor contains a buffer storage BS as a first cache memory and each storage incorporates a work storage WS as a second cache memory.

A processing unit PU(0) 33 of a processor P(0) 3 incorporates a buffer storage BS(0) 35 and an execute unit EU(0) 36. The same structure applies to a processing unit PU(1) 43 of a processor P(1) 4 as well. The buffer storages BS(0) 35 and BS(1) 45 retain copies of a part of data in work storages WS(0) 161 and WS(1) 261 included in storage devices S(0) 1 and S(1) 2 respectively. That is, the data handling system comprises the BS, the WS and the MS constituting a three-layer storage configuration. The execute unit EU(0) 36 or EU(1) 46 issues a store request or a fetch request to the buffer storage BS(0) 35 or BS(1) 45 and stores or fetches data directly to or from the BS(0) 35 or BS(1) 45 when the BS(0) 35 or BS(1) 45 contains desired data to be referenced (this case is described as "InBS (In Buffer Storage)"). In this case, the store request is also issued to the storage device S(0) 1 or S(1) 2 by the processing unit PU(0) 33 or PU(1) 43 When the desired data to be accessed by the fetch request are not found in the BS(0) 35 or BS(1) 45 (that case is described as "NIBS (Not In Buffer Storage)"), the processing unit PU(0) 33 or PU(1) 43 issues a block transfer request to the storage device S(0) 1 or S(1) 2. In the storage device S(0) 1 or S(1) 2, the storage unit SU(0) 16 or SU(1) 26 fetches a block data including the desired data from the WS(0) 161 or WS(1) 261 in response to the block transfer request and transfers the block data to the processing unit PU(0) 33 or PU(1) 43. The block data is stored in the BS(0) 35 or BS(1) 45. And then the execute unit EU(0) 36 or EU(1) 46 fetches data from the BS(0) 35 or BS(1) 45. When the desired data to be accessed by the store request are not found in the BS(0) 35 or BS(1) 45 (NIBS (Not In Buffer Storage)), the processing unit PU(0) 33 or PU(1) 43 issues the store request to the storage device S(0) 1 or S(1) 2 and the data is stored in the WS(0) 161 or WS(1) 261 in response to the store request. The processing unit PU(0) 33 or PU(1) 43 may issues the block transfer request when the data to be accessed by the store request are not found in the BS(0) 35 or BS(1) 45. In this case, The processing unit PU(0) 33 or PU(1) 43 may also issues the store request to the storage device S(0) 1 or S(1) 2 and the data is stored in the WS(0) 161 or WS(1) 261. Data block transfer is carried out between the WS and the BS in a well known manner and will not be described further.

Whenever data in the storage device S(0) 1 or S(1) 2 are updated by the store requests from any one processor, the corresponding data in the buffer storages of all other processors must be invalidated in order to ensure data coherency between all of the buffer storages. This is accomplished by the storage devices S(0) 1 and S(1) 2 transferring invalidation request for invalidating data in the buffer storages which is the same one to be rewritten by a store request to the processors P(0) 3 and P(1) 4 over response signal lines 13 and 14, or 23 and 24. The processors P(0) 3 and P(1) 4 check to see if their buffer storages contain data having the same address of the transferred invalidation request. When their buffer storages contain the data, the processors P(0) 3 and P(1) 4 invalidate the data.

Figure 14:
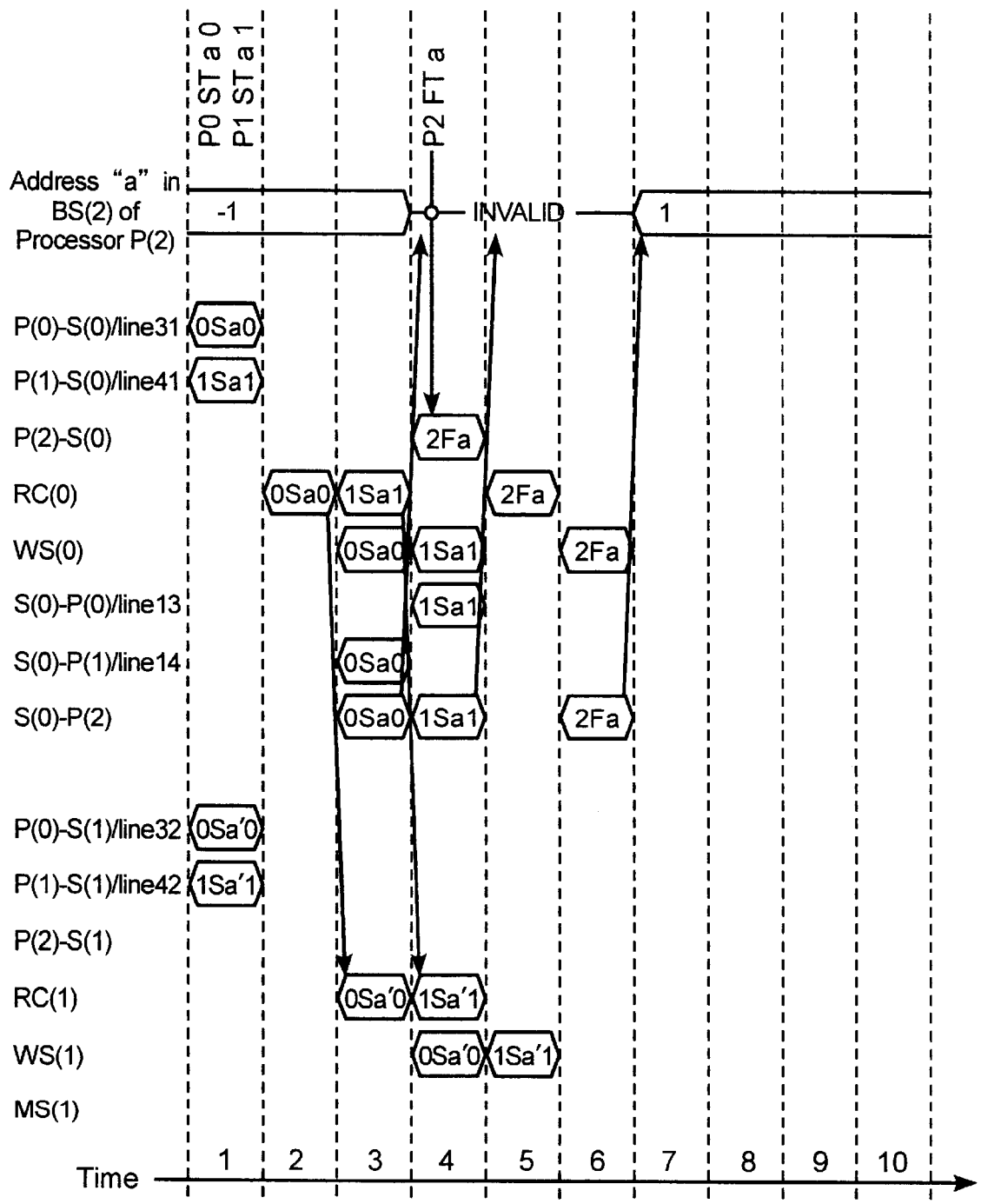
FIG. 14 is a timing chart depicting a first operation example of the further detailed constitution of the embodiment.

FIG. 14 is a timing chart depicting a first operation example of the data handling system shown in FIG. 13. Described below with reference to FIG. 14 is what takes place on three assumptions: (1) that the processor P(0) 3 issues at time 1 a request (POSTa0) for storing a value "0" to address "a"; (2) that the processor P(1) 4 also issues at time 1 a request (P1STa1) for storing a value "1" to address "a"; and (3) that the processor P(2) issues at time 4 a request (P2FTa) for fetching data from address "a." The top portion of FIG. 14 indicates contents stored at address "a" in the BS(2) of the processor P(2).

At time 1, data "−1" has been stored at address "a" in the BS (2). Since address "a" of a master storage region is in the storage unit SU(0) 16 and address "a" of a sub storage region is in the storage unit SU(1) 26 as indicated in FIG. 2, a master store request (0Sa0) from the processor P(0) 3 is issued at time 2 in the storage device S(0) 1, and a master store request (1Sa1) from the processor P(1) 4 is issued at time 3 in the storage device S(0) 1. Both of the master store requests (0Sa0) and (1Sa1) cause the data at address "a" to be updated successively at times 3 and 4 in the storage device S(0) 1. In the storage device S(1) 2, a sub store request (0Sa'0) from the processor P(0) 3 is issued at time 3, and a sub store request (1Sa'1) from the processor P(1) 4 is issued at time 4. The data at address "a" are updated at times 4 and 5 accordingly in the storage device S(1) 2. The processing timings of the store requests (0Sa0, 0Sa'0, 1Sa1, 1Sa'1) are the same as those in FIG. 4 because the data to be accessed are found in the WS 161 and WS 261.

At time 3, the invalidation request (0Sa0) is sent from the storage device S(0) 1 to the processor P(2). At time 4, the data at address "a" of the buffer storage BS(2) in the processor P(2) are invalidated. Thus, at time 4, the processor P(2) issues a block transfer request (2Fa) to the storage device S(0) 1. The block transfer request (2Fa) is issued at time 5. At time 6, the block data fetched from the work storage WS(0) 161 are sent to the processor P(2). Although the invalidation request (1Sa1) is also sent at time 4 from the storage device S(0) 1 to the processor P(2), the invalidation request (1Sa1) is ignored because the data at address "a" in the BS(2) have been invalidated already. At time 3, the invalidation request (0Sa0) is sent to the processor P(1) 4 from the storage device S(0) 1 and the data at address "a" of the buffer storage BS(1) 45 in the processor P(1) 4 are invalidated when the data at address "a" is found in the BS(1) 45. Likewise, the invalidation request (1Sa1) is sent at time 4 to the processor P(0) 3 from the storage device S(0) 1 and the data at address "a" of the buffer storage BS(0) 35 in the processor P(0) 3 are invalidated when the data at address "a" is found in the BS(0) 35. The storage device S(1) 2 does not send either of the invalidation request (0Sa'0) and (1Sa'1), although the data at address "a" are updated in the storage device S(1) 2 by the sub store requests (0Sa'0) and (1Sa'1).

When the request (2Fa) is issued at time 3, the unmodified data "−1" is fetched from the buffer storage BS(2) because the store operation for the store request (0Sa0) have not completed at that point and the invalidation request (0Sa0) have not been sent from the storage device S(0) 1 to the processor P(2) yet. As described above, data in the buffer storages is invalidated by relevant invalidation requests sent from the storage processing the master store requests. For that reason, the storage processing the sub store requests does not need to send any invalidation requests.

Figure 15:
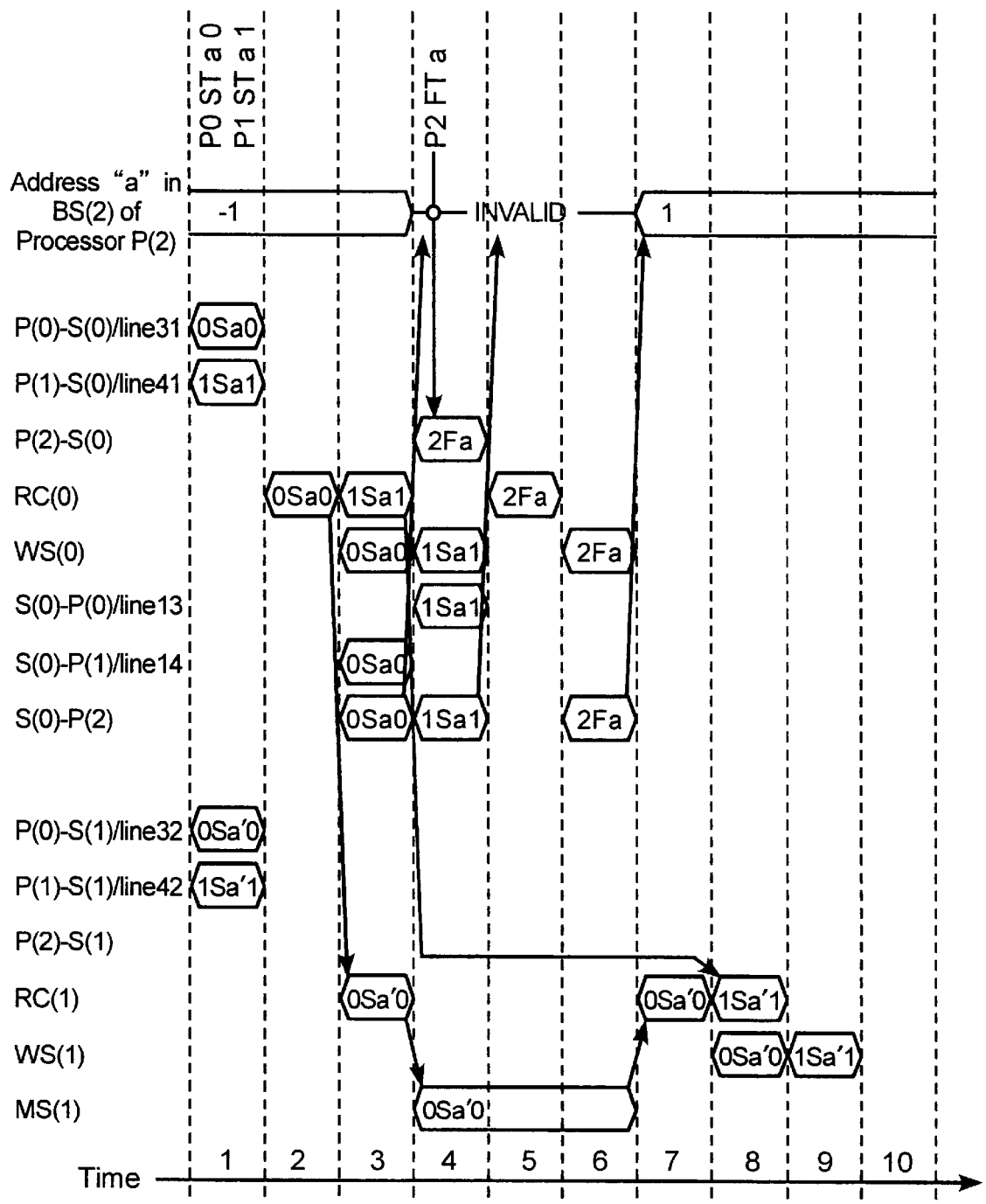
FIG. 15 is a timing chart indicating a second operation example of the further detailed constitution of the embodiment.

FIG. 15 is a timing chart depicting a second operation example. The example of FIG. 15 shows operation timings in effect when data at address "a" are not found in the WS(1) 261 of the storage device S(1) 2. In this example, the sub store request (0Sa'0) causes NIWS processing in the storage device S(1) 2. As a result, the operation timings of the storage device S(1) 2 become the same as those in FIG. 10 and the operation timings of the storage device S(0) 1 are the same as those in FIG. 14. This means that timing for invalidating data of the BS(2) in the processor P(2) is the same as that in FIG. 14.

Figure 16:
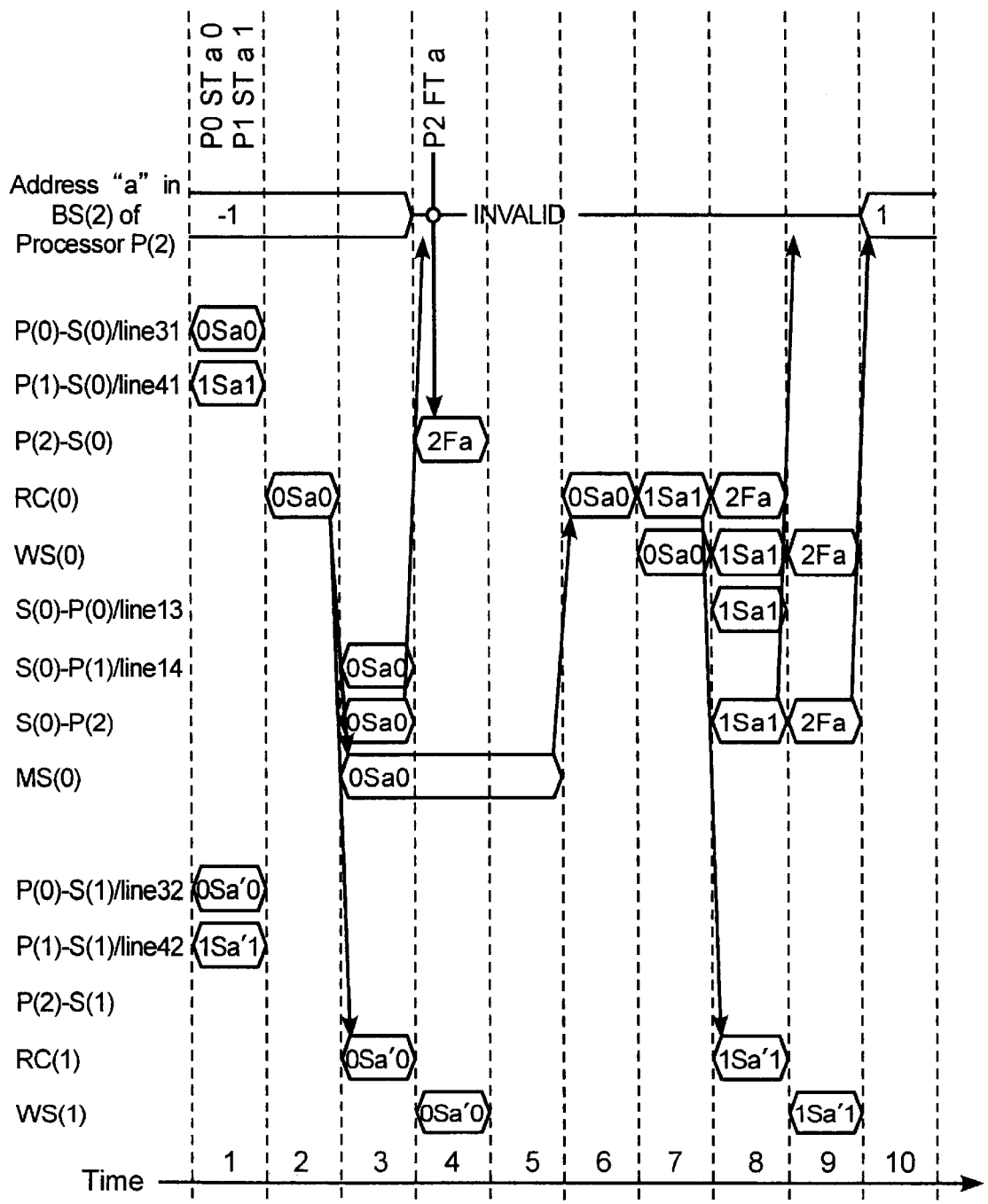
FIG. 16 is a timing chart exhibiting a third operation example of the further detailed constitution of the embodiment.

FIG. 16 is a timing chart depicting a third operation example. The example of FIG. 16 shows operation timings in effect when data at address "a" are not found in the WS(0) 161 of the storage device S(0) 1. In this example, the request (0Sa0) causes NIWS processing in the storage device S(0) 1. As a result, the processing timings of the store requests (0Sa0, 0Sa'0, 1Sa1, 1Sa'1) become the same as those in FIG. 9. Because the invalidation request (0Sao) is sent from the storage device S(0) 1 to the processor P(2) at time 3 when NIWS processing is started in the storage device S(0) 1 and the data at address "a" of the buffer storage BS(2) in the processor P(2) are invalidated, the block transfer request (2Fa) is issued at time 4 to the storage device S(0) 1. In the storage device S(0) 1, the preceding master store request (1Sa1) is issued at time 7 followed by the request (2Fa) issued at time 8. Since data "1" was written in response to the store request (1Sa1) at time 8, the storage device S(1) 0 returns data "1" as data at address "a" to the processor P(2) at time 9 in response to the block transfer request (2Fa). At time 8, the invalidation request (1Sa1) is also sent to the processor P(2) from the storage device S(0) 1 and is ignored because the data at address "a" in the BS(2) have been invalidated already. At time 10, the BS(2) of the processor P(2) retains data "1" at address "a." The invalidation request (0Sa0) is also sent to the processor P(1) 4 at time 3 and the data at address "a" of the buffer storage BS(1) 45 in the processor P(1) 4 are invalidated when the data at address "a" is found in the BS(1) 45. And the invalidation request (1Sa1) is also sent to the processor P(0) 3 at time 8 and the data at address "a" of the buffer storage BS(0) 35 in the processor P(0) 3 are invalidated when the data at address "a" is found in the BS(0) 35.

Although the case in which NIWS processing is started in both of the storage devices S(0) 1 and S(1) 2 has not been explicitly explained, it will be appreciated that the operation timings of the storage processing the master store request are the same as those in FIG. 16 and the operation timings of the storage processing the sub store request are the same as those in FIG. 15 in that case. Because the invalidation requests are issued from only one of the storage devices S(0) 1 and S(1) 2 processing the master store requests, the buffer storages in the processors may be constituted without considering the redundant storage configuration. Since the master storage regions are interleaved to each of the storage devices in increments of appropriate address locations, the invalidation requests issued by each of the storage devices can be made even.

What follows is a description of specific formats of each request, as well as typical constitutions of the request sending control unit RSC and of the request issuing unit.

FIGS. 17A through 17E are schematic views showing typical formats of each request. FIG. 17A shows a format of a request that is sent from the processing unit PU to the request sending control unit RSC. The format is given as "V FT/ST AbsAdr ST-Data," in which "V" is a bit indicating that the request is valid or invalid (1: valid; 0: invalid); "FT/ST" represents the request meaning (FT: fetch; ST: store); "AbsAdr" denotes an absolute address of the storage to be accessed by the request; and "ST-data" stands for store data. No store data is included in the fetch request.

FIG. 17B depicts a format of a request that is issued from the request sending control unit RSC. This format is given as "V FT/ST AbsAdr ST-Data P# Master/Sub S# PhyAdr Sub-S# Hit/Miss." That is, the request that has been issued from the RSC is formed by adding information "P# Master/Sub S# PhyAdr Sub-S# Hit/Miss" to the request of FIG. 17A. In that added portion, "P#" indicates the number of the processor that has issued the request; "Master/Sub" denotes an identification number identifying the request either as a master store request or a sub store request; "S#" represents the number of a storage to be accessed by the request; "PhyAdr" denotes a physical address of the storage to be accessed by the request; "Sub-S#" indicates a number of the storage to which a sub store request is sent; and "Hit/Miss" represents hit/miss information about work storage WS. The number P# is used by a storage returning a response signal or an invalidation request to a processor, and is also used for sending an issued request signal to be described below with reference to FIG. 17C. The number Sub-S# is used by a storage device sending an issued request signal to other storage, and is attached only to master store requests. In the field "Hit/Miss", "Hit" is established as an initial value in the request having issued from the RSC, to be replaced with "Miss" by a storage upon NIWS processing. In accordance with the "Hit/Miss" field, the address compare/control circuit determines whether the request is coming from a processor or is referencing an MS. Obviously, when the storage devices have no WS, the "Hit/Miss" field is unnecessary.

FIG. 17C shows a format of an issued request signal to be sent to the request issuing unit of a storage by another request issuing unit of another storage when the another request issuing unit has issued a master store request. In FIG. 17C, the format of the issued request signal is made of the V bit and the number P# of the processor allowed to issue a sub store request. When there is only one processor, the store request itself may be utilized as an issued request signal. With only one processor provided, requests may be issued from the request queues 183 and 283 in the order in which they were queued. In that case, store operations will proceed in the same order in all of the storage devices. Thus when it is not mandatory to issue the master store request faster than the sub store request in each of the storage devices, the issued request signal need not be sent out. Thus the issued request signal, if used, provides means for keeping the same order in which to process store requests with regard to the same address in all of the storage devices.

FIG. 17D depicts a format of a response signal that is returned from a storage having processed a request to the processor having sent the request. The format of FIG. 17D is made of "V FT/ST AbsAdr FT-Data," in which "FT-Data" denotes fetch data and is in effect only in fetch requests. Other information included in the format of FIG. 17D are the same as those in the format of FIG. 17A.

FIG. 17E illustrates a format of an invalidation request sent by a storage to the processors other than the processor which sent a store request when each processor is provided with a buffer storage BS as a cache memory. The invalidation request is made of "V ST AbsAdr," wherein the "V" bit is a valid bit (V=1) indicating that the request is valid when the request is sent to any processor; and "AbsAdr" designates the absolute address at which data must be invalidated in the buffer storage. Upon receipt of this invalidation request, the processor searches its BS for deciding whether the BS retain data having the same address specified in the "AbsAdr" field or not and invalidates data at the address when the data are found in the BS.

Figure 18:
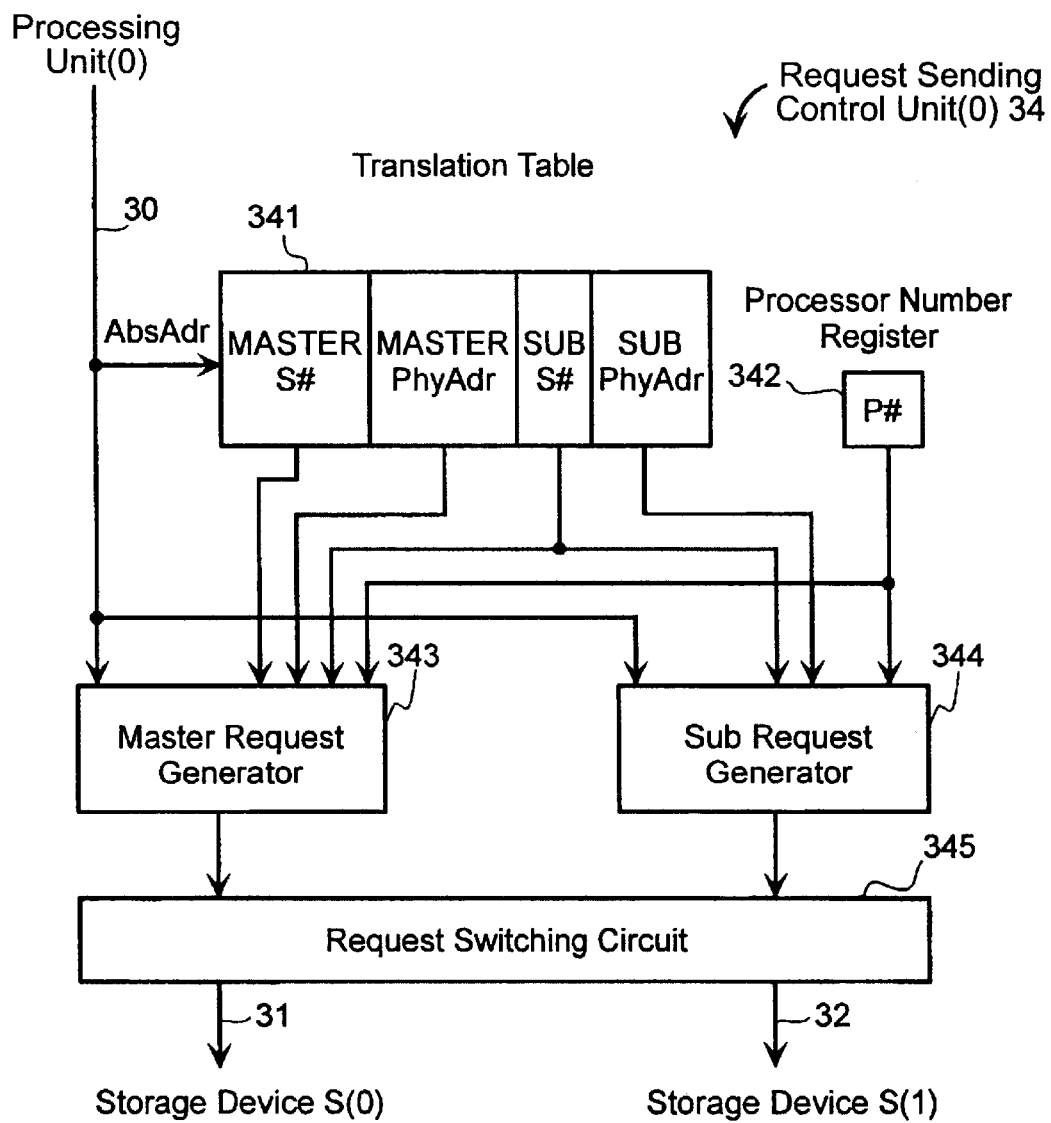
FIG. 18 is a block diagram showing a typical constitution of a request sending control unit.

FIG. 18 is a block diagram showing a typical constitution of a request sending control unit RSC. What is shown here is the RSC(0) 34 in the processor P(0) 3.

The request sending control unit RSC(0) 34 comprises a translation table 341, a processor number register 342, a master request generator 343, a sub request generator 344, and a request switching circuit 345. The translation table 341 includes a plurality of entries each corresponding to one of the storage regions in a memory map such as one shown in FIG. 2 or 6. Each entry contains a storage number allocated a master storage region (Master S#), a physical address of the master storage region (Master PhyAdr), a storage number allocated a sub storage region (Sub S#), and a physical address of the sub storage region (Sub PhyAdr).

FIGS. 19A and 19B show examples of data in translation table applicable to the memory maps in FIGS. 2 and 6 respectively. The processor number register 342 retains the number P# of the processor which includes the RSC, i.e., P(0) in the case of the RSC(0) 34. In FIG. 19A, each of the "Master PhyAdr" field and the "Sub PhyAdr" field is shown corresponding to an absolute address (AbsAdr) given illustratively as "0K–4K–1" indicating that the address ranges from 0K to 4K-1. However, this is a human-readable notation intended solely to facilitate understanding of the map structure. In practice, each entry of each of the "Master PhyAdr" field and the "Sub PhyAdr" field retains high-order binary bits representing an address of 4K or higher. Illustratively, first entry is shown as "0K–4K–1" in FIG. 19A actually holds binary bits "0 . . . 000," next entry "4K –8K–1" holds "0 . . . 001," a following entry "8K–12K–1" holds "0 . . . 010," an further entry "12K–16K–1" holds "0 . . . 011," and so on. In FIG. 19B, addresses are shown arranged in increments of 4M. As in FIG. 19A, each of the "Master PhyAdr" field and "Sub PhyAdrs" field in FIG. 19B corresponds to an absolute address in "AbsAdr" field given illustratively as "0M–4M–1" indicating that the address ranges from 0M to 4M-1. In practice, each entry of each of the "Master PhyAdr" field and the "Sub PhyAdr" field retains high-order binary bits representing an address of 4M or higher. Illustratively, first entry is shown as "0M–4M–1" in FIG. 19B actually holds binary bits "0 . . . 000," next entry "4M–8M–1" holds "0 . . . 001," and so on. Because the unused regions are squeezed up as indicated in FIGS. 6 and 7, an entry having an absolute address in "AbsAdr" field of, for example, "16M–20M–1" holds a number S(0) in "Master S#" field and high-order binary bits "0 . . . 010" representing address locations 4M and higher in "PhyAdr" fields shown as "8M–12M–1". That is, where the "AbsAdr" field holds 16M–20M–1, the physical address in "PhyAdr" field is replaced with (i.e., translated to) "8M 12M–1".

The processing unit PU(0) 33 sends a request as shown in FIG. 17A to the request sending control unit RSC(0) 34 over the request signal line 30. The RSC(0) 34 references that entry in the translation table 341 which corresponds to the AbsAdr of the request, and retrieves the Master S#, Master PhyAdr, Sub S# and Sub PhyAdr from the referenced entry. The master request generator 343 generates a master request upon receipt of the request from the PU(0) 33; and of the Master S#, Master AbsAdr and Sub S# from the translation table 341; and of the P# from the processor number register 342. The sub request generator 344 generates a sub request on receiving the request from the PU(0) 33; and of the Sub S# and Sub AbsAdr from the translation table 341; and of the P# from the processor number register 342. When the meaning FT/ST of the received request is a fetch request, the sub request generator 344 suppresses its request generation.

Requests generated by the master request generator 343 and the sub request generator 344 take on the format shown in FIG. 17B. When the request is a fetch request or a sub store request, the Sub S# (indicating the number of the storage to which the sub store request is sent) is unnecessary. Since there is regular correspondence between the master storage regions and sub storage regions, the Sub S# may be omitted from the request when the storage devices provide with logic to obtain a sub S# based on a master S#. The "Hit/Miss" field of the request, usually set for "Hit" upon initialization, is unnecessary for a system where there is no work storage WS in the storage devices.

In the case of a store request, the request switching circuit 345 is input a master request from the master request generator 343 and a sub request from the sub request generator 344. Then the request switching circuit 345 determines destination storage devices based on the S# in the requests and outputs those requests to the destination storage devices over the request signal lines 31 and 32. In the case of a fetch request, the request switching circuit 345 is input only a master request from the master request generator 343 and outputs the request over one of the request signal lines 31 and 32 based on the S# in the request.

In the translation table of FIG. 19A corresponding to the memory map in FIG. 2, since absolute addresses are equal to physical addresses, the "PhyAdr" field may be omitted. Thus the PhyAdr in the request is unnecessary. In the translation table of FIG. 19B corresponding to the memory map in FIG. 6, absolute addresses are translated to physical addresses so that physical memory space of the storage devices may be utilized efficiently (see FIG. 7).

Figure 20:
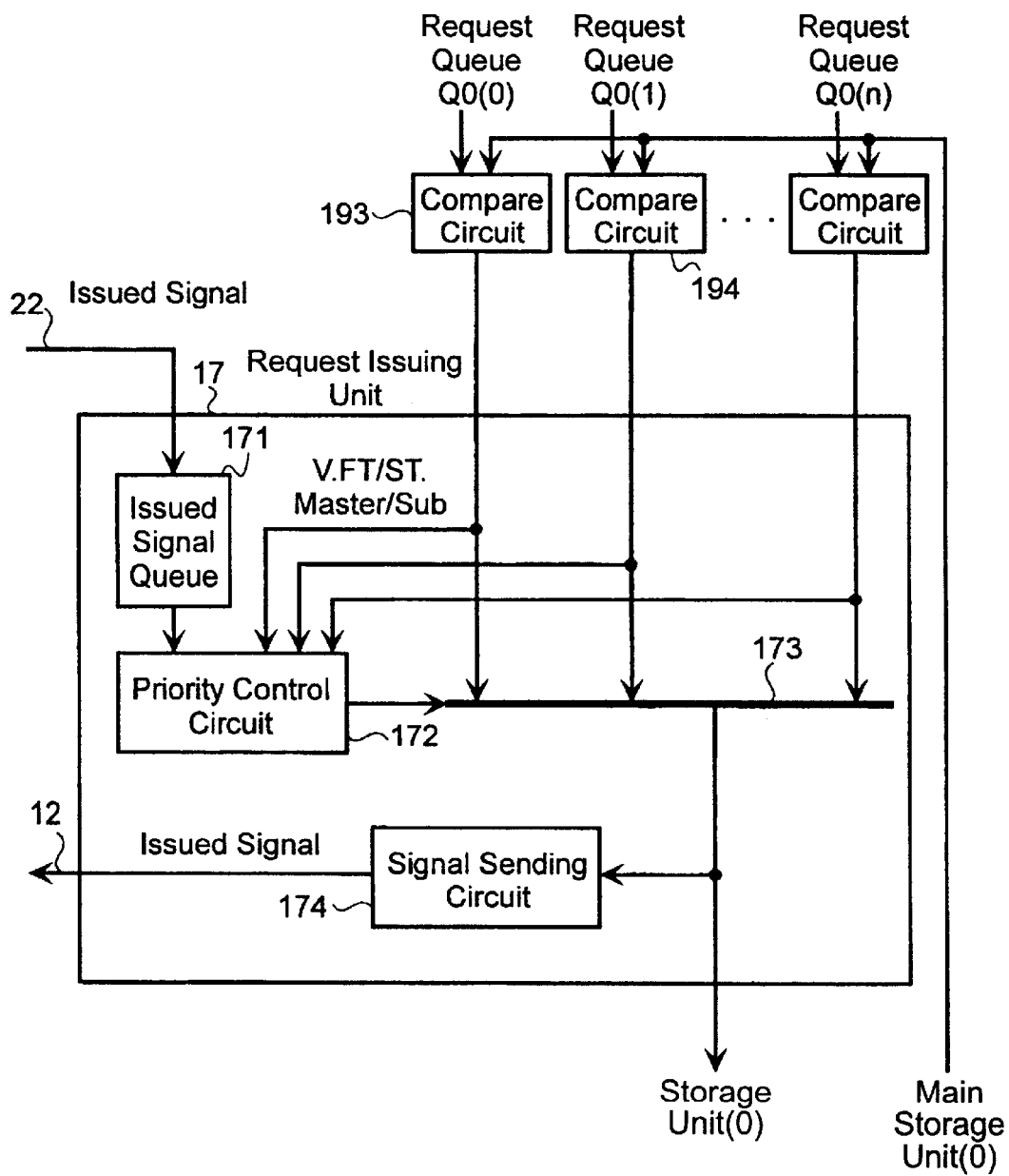
FIG. 20 is a block diagram depicting a typical constitution of a request issuing unit.

FIG. 20 is a block diagram depicting a typical constitution of a request issuing unit. What is shown here is the request issuing unit 17 inside the storage device S(0) 1 of the second embodiment in FIG. 8.

In FIG. 20, The request issuing unit 17 comprises an issued signal queue 171, a priority control circuit 172, a request selecting circuit 173, and an issued signal sending circuit 174. The issued signal queue 171 is an FIFO buffer that is used to issue sub store requests in keeping with the order in which master store requests are issued. As such, the issued signal queue 171 holds issued signals sent over the issued signal line 22 from the request issuing unit 27 of the storage device S(1) 2. As shown in FIG. 17C, each issued signal is composed of the number P# of the processor allowed to issue a sub store request.

Each of the address compare/control circuits 193, 194, etc. receives requests, which includes requests issued by the processors in which "Hit" set in the "Hit/Miss" field and requests returned from the main storage MS(0) 162 upon NIWS processing in which "Miss" set in the "Hit/Miss" field, from each of the request queues Q0(0) 183, Q0(1) 184, etc. Each of the address compare/control circuits 193, 194, etc. keeps the requests having the same AbsAdr or the same P# as those of the requests in which "Miss" set in the "Hit/Miss" field of the requests coming from each of the request queues Q0(0) 183, Q0(1) 184, etc., and outputs other requests having other AbsAdr and P#. And Each of the address compare/control circuits 193, 194, etc. outputs the requests in which "Miss" set in the "Hit/Miss" field at the end of the NIWS processing in SU(0) 16. When there is no WS in the storage devices S(0) 1 and S(1) 2, the address compare/control circuits 193, 194, etc., are unnecessary and the requests from the request queues Q0(0) 183, Q0(1) 184, etc., are fed to the request issuing unit 17 in the same order in which the requests were queued.

The request issuing unit 17 supplies the request selecting circuit 173 with the requests coming from the address compare/control circuits 193, 194, etc., and also sends the "V, FT/ST, Master/Sub" information in the requests to the priority control circuit 172. The priority control circuit 172 also receives issued signals from the issued signal queue 171 in the same order in which the issued signals were queued. The priority control circuit 172 determines the priorities of the requests to be issued based on the "V, FT/ST, P#, Master/Sub" information in the requests as well as on the issued signals. And the priority control circuit 172 instructs the request selecting circuit 173 to issue the requests according to the determined priorities. In this embodiment, the priorities of the requests determined by the priority control circuit 172 are based on the following order:

(1) fetch requests with the P# in ascending order have a top priority;
(2) sub store requests with the P# designated by issued signals have a second priority; and
(3) master store requests with the P# in ascending order have a third priority.

As a result, when the fetch requests head in any of the request queues Q0(0) through Q0(n), those fetch requests are issued irrespective of the issued signals from the issued signal queue 171. Any sub store request is issued only when an issued signal is received from the other request issuing unit.

The request selecting circuit 173 selects requests as instructed by the priority control circuit 172 and transfers the selected requests to the storage unit SU(0) 16. The issued signal sending circuit 174 monitors requests which are output from the request selecting circuit 173. Whenever a master store request with the "Hit" set in the "Hit/Miss" field is output from the request selecting circuit 173, the issued signal sending circuit 174 outputs an issued signal to the storage designated by the Sub S# in the master store request.

Although preferred embodiment of this invention has been described above in specific terms, the data handling system of this invention is not limited to any of such structures as those shown in FIGS. 1, 5, 8 and 13. For example, there may be only one processor, and the cache memory may be limited to a buffer storage within the processor (i.e., a BS-MS double-layer configuration). The request sending control unit RSC may be furnished in each storage devices that master requests and sub requests may be exchanged between the storage devices. The data handling system may be built into desired chip arrangements. Illustratively, the processors and storage devices may be formed altogether into a single chip, or the processors may be formed into a single chip and the storage devices into another chip.

Figure 21:
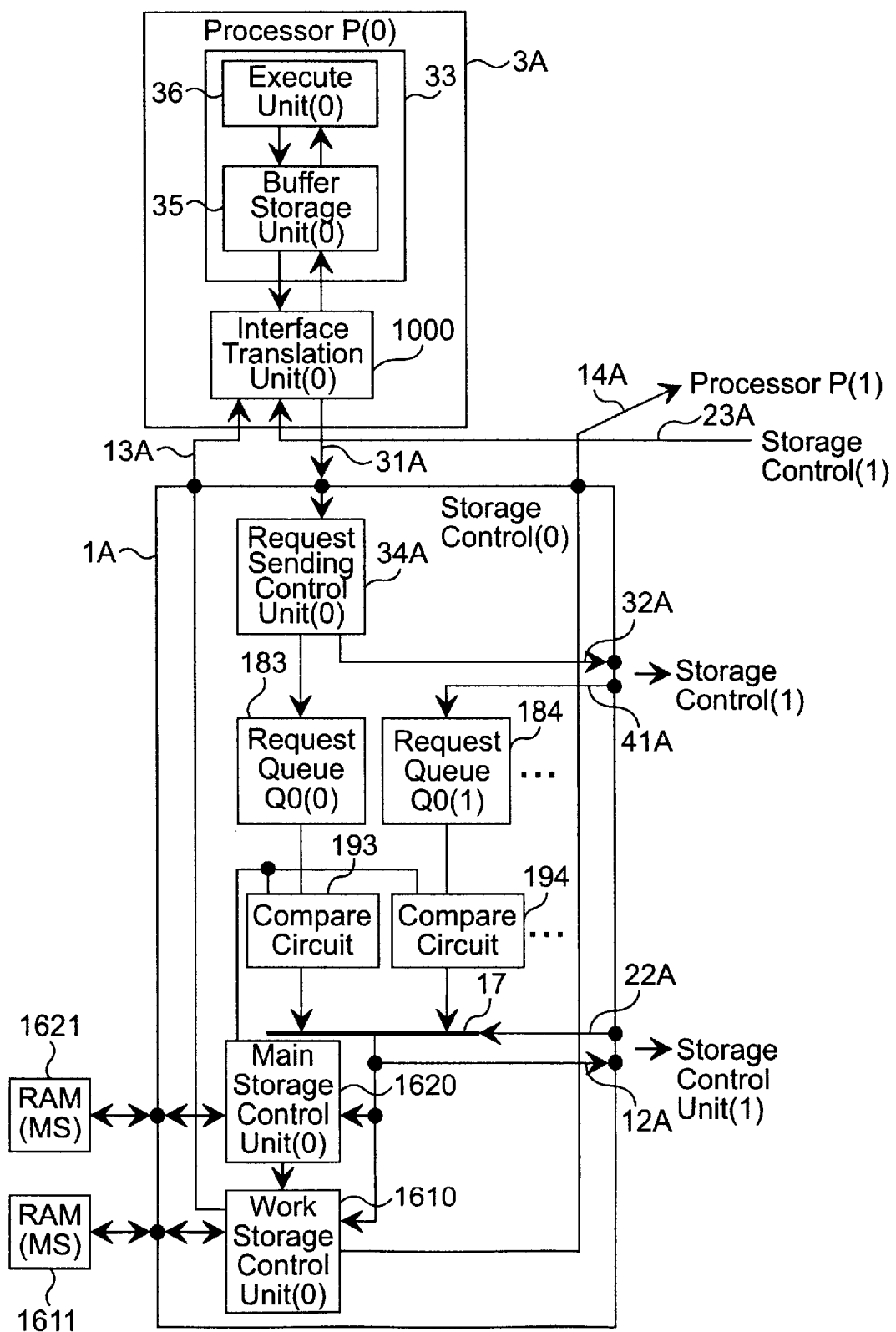
FIG. 21 is a block diagram showing an overall constitution of a variation of the invention.

FIG. 21 is a block diagram showing an overall constitution of a variation of above embodiment wherein a storage control unit 1A is separated from storage units 1611 and 1621. An alphabetic character A adding to a reference numeral (e.g., 3A) in FIG. 21 indicates a device that is equivalent or similar to the part or element having the same reference numeral with no addition in FIG. 13 (e.g., processor 3). Although the configuration of FIG. 21 actually includes a plurality of processors, a plurality of storage control units and a plurality of storage units as same as that shown in FIG. 13, they are omitted from the figure for purpose of simplification.

In FIG. 21, the processor P(0) 3A comprises a processing unit PU(0) 33 and an interface translation unit IFT(0) 1000.

A request sending control unit RSC(0) 34A is included in the storage control unit SC(0) 1A. The processing unit PU(0) 33 issues fetch requests and store requests to the storage units and receives invalidation requests regarding addresses in the BS(0) 35, irrespective of the redundant storage configuration that may be in effect. When the IFT 1000 is designed to allow for each of the processors configured, the processors are incorporated commonly into a system that does not adopt a redundant storage arrangement.

In FIG. 21, the main storage MS(0) 162 in FIG. 13 is divided into a main storage control unit MSC(0) 1620 and a storage unit RAM (random access memory) 1621, and the work storage WS(0) 161 in FIG. 13 is divided into a work storage control unit WSC(0) 1610 and a storage unit RAM 1611. The WSC(0) 1610 and MSC(0) 1620 are located inside the storage control unit SC(0) 1A that is connected to the RAMs 1611 and 1621. When the MSC(0) 1620 and WSC(0) 1610 are designed to accommodate a redundant storage configuration and to comply with a RAM interface that is currently connected, the RAMs are of a common type RAM, which need only be capable of permitting fetch and store operations on specific addresses, irrespective of the redundant storage arrangement. Other elements of the storage control unit 1A are structurally and functionally identical to those of the corresponding unit in the storage device S(0)1 shown in FIG. 13. Obviously, the RAMs 1611 and 1621 may also be incorporated in the storage control unit SC(0) 1A.

In the above variation providing the storage control unit SC(0) 1A designed to allow for the redundant storage configuration, ordinary processors and RAMS are used regardless of the redundant arrangement. Such parts are readily formed into a chip singly or in combination if so desired.

The request queues Q0(0) 183 and Q0(1) 184 may alternatively be replaced with a single queue. In that case, the request issuing unit 17 refers to the P# of the request held in each entry of the single queue and issue the first request of each P# as if an independent queue is provided for each processor number.

In the structure of FIG. 21, the storage control unit SC(0) 1A appears independent of an adjacent storage control unit SC(1) 1B, not shown. Alternatively, these storage control units may be replaced with an integral storage control unit.

As described above, the data handling system according to the preferred embodiment can even out the workload between storage devices constituting a redundant storage configuration. In the data handling system, the storage devices constituting the redundant storage arrangement are allowed to operate continuously without conflict therebetween even if they are subject to different operation timings. In the data handling system having work storages as cache memory in the storage devices, when NIWS happens, NIWS processing time in the storage constituting redundant storage arrangement is substantially equivalent to that in the non-redundant storage. Further, in the data handling system having buffer storages as cache memory in the processors, invalidation requests for the buffer storages are issued from any one of the storage devices constituting the redundant storage configuration. Redundant issuance of invalidation requests from all of the storage devices are prevented.

While the invention has been described with respect to a best mode and preferred embodiment, for the specific advantages thereof, further embodiments, modifications and variations are contemplated according to the broader aspects of the present invention all according to the spirit and scope of the following claims.

What is claimed is:

1. A data storage method for storing or fetching data to or from a storage according to a store request or a fetch request issued from at least one processing device, comprising:
providing the storage having duplicate data stored in separate storage devices, respectively;
receiving at least two fetch requests from the processing device, which the two fetch requests are to fetch different first and second desired data out of the duplicate data, respectively;
fetching the first desired data from one of the separate storage devices and fetching the second desired data from the other of the separate storage devices;
sending the first and second desired data to the processing device;
receiving at least one store request from the processing device, which the store request is to store third desired data in the storage;
storing the third desired data in all of the separate storage devices;
wherein said step of providing provides separate second storage devices in the storage corresponding to the separate storage devices and having a copy of a part of data stored in corresponding one of the separate storage devices, respectively;
said step of storing further including the following steps of:
transferring data stored at the same address as that at which the third desired data is stored from at least one of the separate storage devices to the corresponding one of the separate second storage devices which does not have the data;
said step of transferring transfers the data from at least two of the separate storage devices to corresponding at least two separate second storage devices, in parallel when the at least two separate second storage devices do not have the data;
storing the third desired data in all of the second storage devices; and
prohibiting from fetching the data and storing any data at the same address at which the third data is stored according to other fetch requests and store requests while the data is being transferred from at least one of said separate storage devices to the corresponding one of said separate second storage devices.

2. A data storage method for storing or fetching data to or from a storage according to a store request or a fetch request issued from separate processing devices, wherein the separate processing devices having a second storage device retaining a copy of a part of data stored in at least one of the separate storage devices, respectively, comprising:
providing the storage having duplicate data stored in separate storage devices, respectively;
receiving at least one store request from the separate processing devices, which the store request is to store third desired data in the storage;
storing the third desired data in all of the separate storage devices; and
sending an invalidation request at least to the second storage devices of the processing devices other than one of the processing devices having issued the at least one of store request in response to storing the third desired data in only one of the separate storage devices, which the invalidation request is to invalid data at the same address as that at which the third desired data is stored in the second storage devices.

3. A data storage method according to claim 2,
wherein said step of providing provides separate third storage devices in the storage corresponding to the separate storage devices and having a copy of a part of data stored in corresponding one of the separate storage devices, respectively;
wherein said step of storing stores the third desired data in all of the separate third storage devices; and
wherein said step of sending sends the invalidation request in response to storing the third desired data in only one of the separate third storage devices.

4. A data storage in which desired data is stored and from which desired data is fetched according to a store request or a fetch request issued from at least one processing device, comprising:
separate storage devices;
a first controller storing duplicate data in said separate storage devices, respectively;
a second controller receiving at least two fetch requests from the processing device, which the two fetch requests are to fetch different first and second desired data out of the duplicate data, respectively;
said first controller fetching the first desired data from one of said separate storage devices and fetching the second desired data from the other of said separate storage devices; and
means for outputting the first and second desired data to the processing device.

5. A data storage according to claim 4,
wherein said second controller receiving at least one store request from the processing device, which the store request is to store third desired data in the storage; and
wherein said first controller storing the third desired data in all of said separate storage devices.

6. A data storage according to claim 5,
wherein said second controller receiving at least two store requests from the processing device, which the two store requests are to store fourth and fifth desired data at the same address, respectively; and
wherein said first controller sequencing the two store requests and storing the fourth and fifth desired data at the same address in all of said separate storage device with the sequenced order.

7. A data storage according to claim 6,
wherein said first controller comprises at least one request queue holding each of the store requests and the fetch requests temporarily; and at least one request selector selecting store requests to the same address from said request queue in turn and storing desired data in each of said separate storage devices according to the selected store requests.

8. A data storage according to claimin 6, further comprising:
separate second storage devices corresponding to said separate storage devices, respectively;
wherein said first controller storing a copy of a part of data stored in each of said separate storage devices in the corresponding one of said separate second storage devices, respectively; and
wherein said first controller transferring data stored at the same address as that at which the third desired data is stored from at least one of the separate storage devices to the corresponding one of the separate second storage devices which does not have the data, transferring the data from at least two of said separate storage devices to corresponding at least two separate second storage devices, in parallel when the at least two separate second storage devices do not have the data, and storing the third desired data in all of said second storage devices.

9. A data storage according to claim 8, wherein said first controller prohibiting from fetching the data and storing any data at the same address at which the third data is stored according to other fetch requests and store requests while the data is being transferred from at least one of said separate storage devices to the corresponding one of said separate second storage devices.

10. A data storage according to claim 5, to which a plurality of the processing devices issue store requests or fetch requests, wherein each of the processing devices having a second storage device retaining a copy of a part of data stored in at least one of the separate storage devices, further comprising:

means for sending an invalidation request at least to the second storage devices of the processing devices other than one of the processing devices having issued the at least one of store request, in response to storing the third desired data in only one of said separate storage devices, which the invalidation request is to invalid data at the same address as that at which the third desired data is stored in the second storage devices.

11. A data storage according to claim 10, further comprising:

separate third storage devices corresponding to said separate storage devices;

wherein said first controller storing a copy of a part of data stored in each of said separate storage devices in the corresponding one of said separate second storage devices, respectively;

wherein said first controller storing the third desired data in all of said separate third storage devices; and wherein said sending means sending the invalidation request in response to storing the third desired data in only one of said separate third storage devices.

12. A data storage according to claim 11, wherein the second storage device serve as first cache memory;

wherein each of said separate third storage devices serve as second cache memory.

13. A data storage according to claim 4, wherein one of said separate storage devices being designated as master storage device and the other separate storage devices being designated as sub storage device in every fixed increments of addresses alternately; and wherein said first controller fetching the first desired data from one of said separate storage devices designated as the master storage device in a fixed increment of addresses which include the first desired data and fetching the second desired data from the other of said separate storage devices designated as the master storage device in another fixed increment of addresses which include the second desired data.

14. A data storage according to claim 13, wherein said second controller determining one of said separate storage devices designated as master storage device according to a meaning and an address of each received fetch request.

* * * * *